United States Patent
Bhattacharya et al.

(10) Patent No.: US 9,955,425 B2
(45) Date of Patent: Apr. 24, 2018

(54) POWER MANAGEMENT IN MULTI-TECHNOLOGY WIRELESS COMMUNICATION DEVICES

(71) Applicant: QUALCOMM Incorporated, San Diego, CA (US)

(72) Inventors: Sabyasachi Bhattacharya, Hyderabad (IN); Ajeet Kumar, Hyderabad (IN); Ajay Kumar Reddy Boddu, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 169 days.

(21) Appl. No.: 14/918,710

(22) Filed: Oct. 21, 2015

(65) Prior Publication Data

US 2017/0118715 A1    Apr. 27, 2017

(51) Int. Cl.
*H04W 52/02* (2009.01)
*H04W 88/06* (2009.01)

(52) U.S. Cl.
CPC ... *H04W 52/0251* (2013.01); *H04W 52/0261* (2013.01); *H04W 88/06* (2013.01)

(58) Field of Classification Search
CPC ......... H04W 52/0251; H04W 52/0261; H04W 88/06
See application file for complete search history.

(56) References Cited

U.S. PATENT DOCUMENTS

| | | | | |
|---|---|---|---|---|
| 8,655,307 | B1 * | 2/2014 | Walker | H04W 52/0212 455/343.5 |
| 9,030,979 | B2 | 5/2015 | Cheng et al. | |
| 2008/0132291 | A1 * | 6/2008 | Barr | H04W 48/18 455/567 |
| 2009/0068969 | A1 | 3/2009 | Lindoff et al. | |

(Continued)

FOREIGN PATENT DOCUMENTS

GB    2504541 A    2/2014

OTHER PUBLICATIONS

International Search Report and Written Opinion—PCT/US2016/048120—ISA/EPO—dated Jan. 24, 2017.

(Continued)

*Primary Examiner* — Mohammad S Anwar
(74) *Attorney, Agent, or Firm* — The Marbury Law Group, PLLC

(57) ABSTRACT

Methods and devices may select a particular radio access technology (RATs) available on a multi-technology wireless communication device to support a user activity based on monitored device usage patterns and power consumption profiles of the various RATs. Various embodiments may enable multi-RAT wireless communication devices to monitor the usage patterns of each service (i.e., wireless communication link) provided by the device, and estimate the power consumption during the user activity based on the power needs of services and the user activity. A multi-RAT wireless communication device may determine whether switching, enabling, or disabling services and/or RATs (Continued)

would reduce power consumption. Thus, the wireless communication device may extend the time that a user can perform a user activity when battery reserves are low by switching to a lower-power RAT and/or disabling power-hungry services.

25 Claims, 15 Drawing Sheets

(56) References Cited

U.S. PATENT DOCUMENTS

| | | |
|---|---|---|
| 2011/0040990 A1 | 2/2011 | Chan et al. |
| 2012/0169608 A1 | 7/2012 | Forutanpour et al. |
| 2013/0102313 A1 | 4/2013 | Tinnakornsrisuphap et al. |
| 2013/0150032 A1 | 6/2013 | Pattaswamy et al. |
| 2013/0262891 A1 | 10/2013 | Gudlavenkatasiva et al. |
| 2014/0128021 A1 | 5/2014 | Walker et al. |
| 2014/0213256 A1* | 7/2014 | Meylan ................. H04W 36/22 455/436 |
| 2015/0153810 A1 | 6/2015 | Sasidharan et al. |

OTHER PUBLICATIONS

Partial International Search Report—PCT/US2016/048120—ISA/EPO—dated Nov. 14, 2016.

* cited by examiner

| Services — 302 | Power Consumption — 304 |
|---|---|
| WiFi | 0.2 Watts/t |
| BlueTooth | 0.15 Watts/t |
| WiFi+BlueTooth | 0.3 Watts/t |

| Activity — 312 | RAT — 314 | RSSI (dbm) — 316 | Services Enabled — 318 | Power Consumption — 320 |
|---|---|---|---|---|
| Voice Call | GSM | 90-100 | WiFi<br>WiFi+GPS | 0.2 Watts/t<br>0.3 Watts/t |
| Voice Call | WCDMA | 80-90 | WiFi<br>BlueTooth | 0.2 Watts/t<br>0.15 Watts/t |
| Data Call (VOIP) | LTE | 80-90 | WiFi | 0.2 Watts |

| Contact/Activity — 332 | Period — 334 | Duration (mins) — 336 |
|---|---|---|
| 000-111-2222 | 00:00 Hrs to 06:00 Hrs | 12.5 |
| Social Media Website | 12:00 Hrs to 14:00 Hrs | 35.2 |
| Streaming Audio | 16:30 Hrs to 19:00 Hrs | 23.6 |

FIG. 3C

POWER MANAGEMENT IN MULTI-TECHNOLOGY WIRELESS COMMUNICATION DEVICES

BACKGROUND

An important factor in user experience with multi-technology wireless communication devices is how long the device can perform its various functions on a single battery charge ("battery life"). The constant engagement of a variety of software and hardware capabilities results in substantial power consumption reducing battery life. The power drain experienced by the wireless communication device battery may vary for services offered on different radio access technologies ("RATs"). For example, a service carried out on a subscription supporting Bluetooth may drain more battery resources than the same service offered over a subscription supporting Wi-Fi. Thus, changes in RAT selection from a power hungry RAT to a lower power consumption RAT may extend battery life and result in an improved user experience.

SUMMARY

Various embodiments include methods implemented on a multi-technology wireless communication device of managing power resources to support a user activity when a battery state may not support the user activity duration. Various embodiments include estimating a user activity duration executing on the multi-technology wireless communication device based on historic user activity usage information, determining a current average power consumption of the user activity based on historic power consumption by the user activity under current operating conditions for a radio access technology (RAT) on which the user activity is camped, estimating a service activity duration for the user activity based on at least the current average power consumption and a charge state of the battery, determining whether the estimated user activity duration exceeds the estimated service activity duration, and implementing a power management strategy in response to determining that the estimated user activity duration exceeds the estimated service activity duration.

In some embodiments, implementing the power management strategy may include selecting a RAT, determining whether moving the user activity to the selected RAT is possible, and moving the user activity to the selected RAT in response to determining that moving the user activity to the selected RAT is possible. In such embodiments, selecting the RAT may include determining a second average power consumption based on historic power consumption needs of the user activity under the current operating conditions for the selected RAT, determining whether the second average power consumption is less than the current average power consumption, and may further include moving the user activity to the selected RAT in response to determining that moving the user activity to the selected RAT is possible is also in response to determining that the second average power consumption is less than the current average power consumption. In such embodiments, selecting the RAT may include determining a second average power consumption based on historic power consumption needs of the user activity under the current operation conditions for the selected RAT, estimating a second service activity duration for the user activity based on at least the second average power consumption and the charge state of the battery, determining whether the estimated user activity duration exceeds the estimated second service activity duration, and may further include moving the user activity to the selected RAT in response to determining that moving the user activity to the selected RAT is possible is also in response to determining that the estimated user activity duration does not exceed the estimated second service activity duration. In such embodiments, determining whether moving the user activity to the selected RAT is possible may be based on a current signal condition of the selected RAT.

Some embodiments may further include generating a list of selected RATs, selecting a RAT from the list of selected RATs, determining whether moving the user activity to the selected RAT is possible, and moving the user activity to the selected RAT in response to determining that moving the user activity to the selected RAT is possible. In such embodiments, generating the list of selected RATs may include determining a second average power consumption for each RAT based on historic power consumption needs of the user activity under the current operating conditions, determining whether the second average power consumption for each RAT is less than the current average power consumption, and adding to the list of selected RATs any RAT for which the second average power consumption is less than the current average power consumption. In such embodiments, generating the list of selected RATs may include determining a second average power consumption for each RAT based on historic power consumption needs of the user activity under the current operation conditions, estimating a second service activity duration for the user activity for each RAT based on at least the determined average power consumption and the charge state of the battery, determining whether the estimated user activity duration exceeds the estimated second service activity duration for each rat, and adding to the list of selected RATs each RAT for which the estimated user activity duration does not exceed the estimated second service activity duration. In such embodiments, determining whether moving the user activity to the selected RAT is possible is based on a current signal condition of the selected RAT.

In such embodiments, generating the list of selected RATs may include determining a second average power consumption for each RAT based on historic power consumption needs of the user activity under current operating conditions, determining whether the second average power consumption is less than the current average power consumption, and adding to the list of selected RATs each RAT for which the second average power consumption is less than the current average power consumption, with the RATs included in the list in an order based on the second average power consumption. In such embodiments, generating the list of selected RATs may include determining a second average power consumption for each RAT based on historic power consumption needs of the user activity under current operating conditions, estimating a second service activity duration for the user activity for each RAT based on at least the second average power consumption and the charge state of the battery, and adding to the list of selected RATs each RAT for which the estimated second service duration exceeds the estimated user activity duration, with the RATs included in the list in an order based on estimated service durations. In some embodiments, implementing the power management strategy may include determining whether disabling one or more services will increase the duration that the battery can sustain the user activity for the estimated user activity duration based on historic power consumption for each service of the multi-technology wireless communication device, and disabling one or more services in response to determining that disabling the one or more services will increase the duration that the battery can sustain the user activity for the estimated user activity duration. Such embodiments may further include selecting a RAT, determining whether moving the user activity to the selected RAT is possible, and moving the user activity to the selected RAT in response to determining that moving the user activity to the selected RAT is possible. Alternatively, such embodiments may include generating a list of selected RATs, selecting a RAT from the list of selected RATs, determining whether moving the user activity to the selected RAT is possible, and moving the user activity to the selected RAT in response to determining that moving the user activity to the selected RAT is possible.

Further embodiments may include a multi-technology wireless communication device having a memory, a plurality of radio frequency (RF) resources, and a processor configured with processor-executable instructions to perform operations of the methods described above. Further embodiments may include a multi-technology wireless communication device having means for performing functions of the methods described above. Further embodiments include a non-transitory processor-readable storage medium on which is stored processor-executable instructions configured to cause a processor of a multi-technology wireless communication device to perform operations of the methods described above.

BRIEF DESCRIPTION OF THE DRAWINGS

The accompanying drawings, which are incorporated herein and constitute part of this specification, illustrate exemplary embodiments of the methods and devices. Together with the general description given above and the detailed description given below, the drawings serve to explain features of the methods and devices, and not to limit the disclosed embodiments.

FIG. 3A is a block diagram illustrating a data structure associated with a service profiler module implemented in a multi-RAT wireless communications device.

FIG. 3B is a block diagram illustrating a data structure associated with an activity profiler module implemented in a multi-RAT wireless communications device.

FIG. 3C is a block diagram illustrating a data structure associated with a user activity profiler module implemented in a multi-RAT wireless communications device.

DETAILED DESCRIPTION

Figure 1:
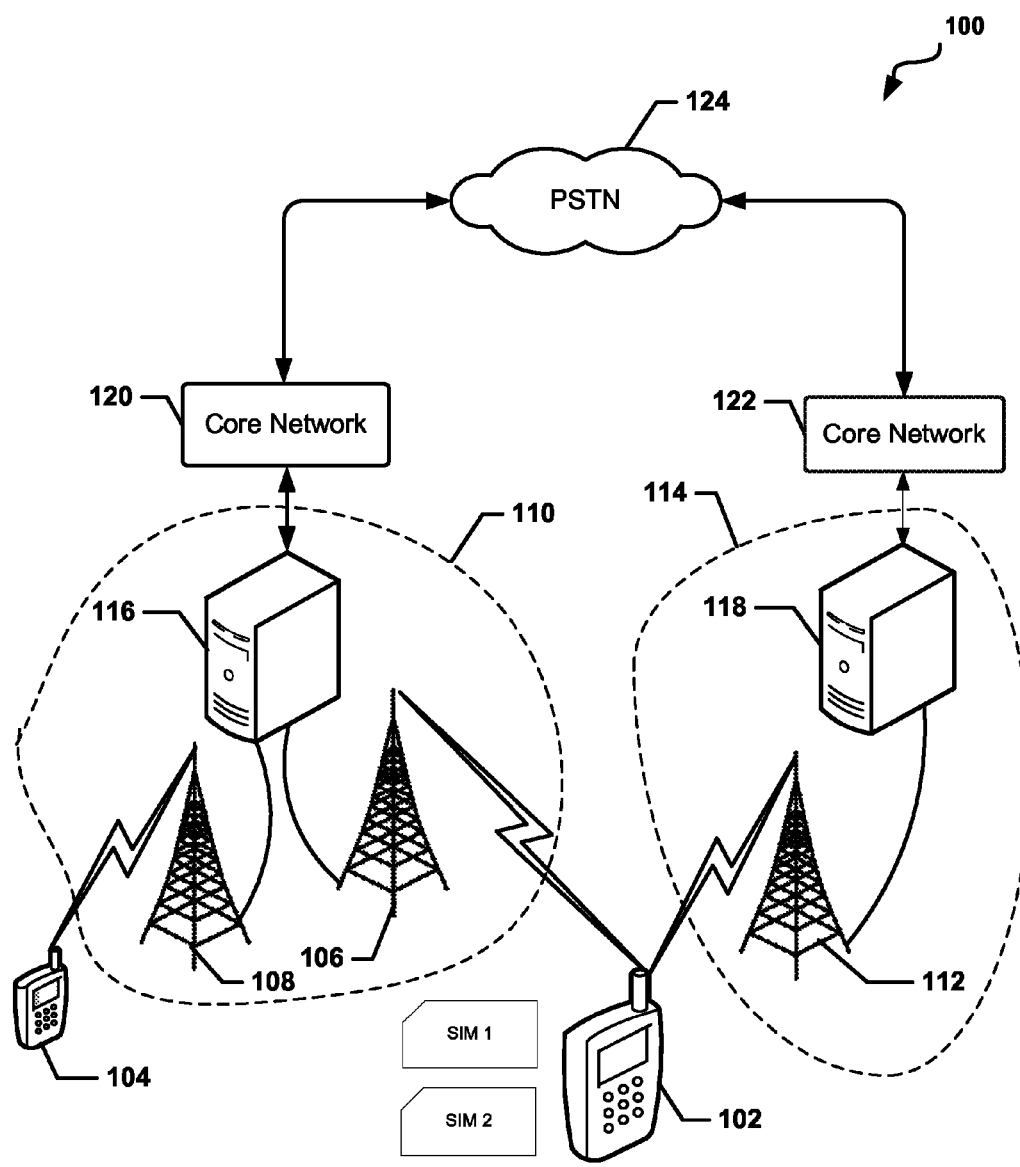
FIG. 1 is a communication system block diagram of a network suitable for use with various embodiments.

Various embodiments will be described in detail with reference to the accompanying drawings. Wherever possible the same reference numbers will be used throughout the drawings to refer to the same or like parts. References made to particular examples and implementations are for illustrative purposes, and are not intended to limit the scope of the claims.

The term "wireless communications device" is used herein to refer to any one or all of mobile computing devices that include wireless communication functionality. Examples of wireless communication devices include cellular telephones, smart phones, wearable computing devices, personal or mobile multi-media players, personal data assistants (PDAs), laptop computers, tablet computers, smart books, palm-top computers, wireless electronic mail receivers, multimedia Internet enabled cellular telephones, wireless gaming controllers, mobile robot, and similar personal electronic devices that include a programmable processor, memory and circuitry for establishing wireless communication pathways and transmitting/receiving data via wireless communication pathways.

As used herein, the terms "subscriber identification module (SIM)," "subscription," and "subscription card" are used interchangeably to mean a memory that may be an integrated circuit or embedded into a removable card, which stores an International Mobile Subscriber Identity (IMSI), related key, and/or other information used to identify and/or authenticate a wireless communication device on a network. The term subscription may also be used as shorthand reference to a communication network and supported subscription associated with a particular subscription, since the information stored in a subscription enables the wireless communication device to establish a communication link with a particular network, thus the subscription and the communication network, as well as the services and subscriptions supported by that network, correlate to one another.

Various embodiments may selectively use different radio access technologies (RATs) supported on a multi-RAT wireless communication devices. The particular RAT that is selected for a user activity may be based on monitored device usage patterns. A result of the selective use of RATs may be improved battery life. Various embodiments may enable multi-RAT wireless communication devices to monitor the usage patterns of each service (i.e., wireless communication link) provided by the device. A multi-RAT wireless communication device may estimate current power consumption based on the power needs of services and the monitored user activity. A multi-RAT wireless communication device may also determine whether any combination of switching, enabling, or disabling services and/or RATs would reduce power consumption. Thus, the wireless communication device may extend user activity duration during periods of low battery life by switching to a lower-power RAT and/or disabling power-hungry services.

When a user initiates a user activity, such as a voice call, a device processor may estimate the amount of time the user is likely to engage in the user activity (i.e., determine an "estimated user activity duration"). The estimated user activity duration may be based on historic activity usage patterns. Using the estimated user activity duration, the processor may calculate an average power consumption estimate by multiplying the estimated user activity duration by a power demand profile for the RAT currently supporting the user activity (i.e., historic power consumption for the applicable RAT). If the processor determines that the power that will be drawn by the current RAT for the length of the estimated user activity duration exceeds the energy stored in the battery (i.e., the user activity will drain the battery), the processor may implement a power management strategy. In some embodiments, the power management strategy may involve one or both of selecting and switching to a lower power RAT to support the user activity and/or disabling unnecessary services. Implementing such a power management strategy may enable the wireless communication device to support the user activity with the amount of energy that remains stored in the battery. The selected RAT may have power requirements that can be supported by the current battery charge state for the estimated user activity duration.

In some embodiments, a service activity duration may be estimated based on the power consumption of the current RAT and the device's current battery charge state. Service activity durations may also be estimated for other RATs available on the wireless communication device to determine whether they are more power efficient than the current RAT. A more power-efficient RAT may support the user activity for a longer duration with the current battery charge state. In such cases, the user may be notified (e.g., in a displayed prompt) that changing RATs may enable the selected activity to continue for the estimated user activity duration without interruption. The wireless communication device may switch, disable, or enable services and/or RATs to minimize power consumption and increase the duration of a user activity.

The wireless communication device may include a processor executing modules to automatically switch RATs between services, thereby extending battery life and the user activity duration. For example, the modules may include an activity profiler module (APM) that maintains an empirical power profile for each activity associated with a particular RAT, such as a voice call on GSM, voice call on WCDMA, and data call on LTE. The modules may also include a service profiler module (SPM) that maintains an empirical power profile for each service individually and with different RATs (e.g., Wi-Fi consumes X watts/min, Wi-Fi+GPS consumes Y watts/min, etc.). The modules may also include a user activity profiler module (UAPM), for example maintained in triplet form, that stores user activity usage patterns including time and duration of a user activity. The modules may be trained on actual user activity usage data and service power consumption data in order to generate predictive models. In addition to or in lieu of training a predictive model, third party data may be obtained and used to populate the UAPM, SPM, and APM modules. The predictive models or third party data may be used to estimate future user activity characteristics, particularly user activity duration and associated power consumption. These modules may be dynamically adjustable and may update continuously as usage patterns and activity power characteristics change.

In various embodiments, a wireless communication device may use the UAPM, APM, and/or SPM modules to implement a power management strategy, which may include one or both of determining a RAT that will support a current activity and result in reduced power consumption and/or disabling one or more unnecessary services. The wireless communication device may access the UAPM to determine an estimated user activity duration based on prior user activity usage patterns for a user activity. Similarly, the wireless communication device may access the APM to determine an estimated user activity power consumption. The estimated user activity power consumption may be used along with power consumption information for other service activities and battery charge state information to estimate a service activity duration. An estimated service activity duration may represent the length of time that the communications device can maintain the user activity under current power consumption conditions and the current battery charge state.

In various embodiments, the wireless communication device may be configured to determine whether the estimated user activity duration exceeds the estimated service activity duration. If the estimated user activity duration exceeds the estimated service activity duration, the wireless communication device may access the SPM to identify permutations of services and/or RATs that may be switched, disabled, or enabled to improve power consumption. In some embodiments, a user may be presented with the options of switching, enabling, or disabling services like Wi-Fi, Bluetooth through a displayed prompt. In some embodiments, the user may be presented with the option of both disabling one or more services and/or switching the user activity to a more power efficient RAT.

Various embodiments may include using the UAPM, APM, and SPM modules to determine whether disabling a service will increase remaining battery life. In various embodiments, one or more services may be disabled in lieu of or in addition to switching RATS. A wireless communications device may access the SPM to determine an estimated power consumption for each currently active service based on the RAT actively supporting each service. The communication device may be configured to determine whether disabling a combination of the services would provide a sufficient increase in battery life to support the user activity for the estimated user activity duration. The processor of the wireless communication device may disable the combination of services identified as providing sufficient battery life improvement. In one example, the disabling of services may be performed, for a new RAT and/or for the existing RAT.

In various embodiments, the wireless communication device processor may move the user activity to an alternate RAT in order to reduce power consumption. The user activity may be moved to a new RAT before, after, or in lieu of disabling or attempting to disable services to obtain a power increase sufficient to maintain the user activity for the estimated user activity duration. To select a new RAT on which to camp the user activity, the processor may use the APM. The processor may access the APM to determine estimated average power consumption of the user activity if camped on the different (second) RAT. The processor may use the second average power consumption profile associated with the second RAT and the battery charge state information to determine the estimated second service activity duration. This estimated second service activity duration may be compared to the estimated user activity duration to determine which is larger. If the estimated second service activity duration is larger, the user activity may be moved to the second RAT. Multiple different RATs may be placed into a list, ordered or otherwise, and the wireless communication device processor may select RATs for re-camping the user activity by sequentially evaluating each RAT in this manner.

In different situations, one or both of disabling services and switching RATs may provide power savings sufficient to support execution of the user activity for the estimated length of time. Attempting both RAT switching and service disablement may improve power savings beyond that which may be obtained by implementing a single strategy and may enable the user activity to continue execution past the estimated length of time. By selecting RAT configurations and/or disabling services to reduce power consumption, the wireless communication device may reduce the operating temperature within the device. Reductions in temperature may extend the duration that activities can be supported by the current battery charge state, while protecting the device against excessive temperatures. These features may have the advantage of improving the overall user experience.

Various embodiments may include switching, enabling, or disabling one or more service and/or RAT configurations. In one example, the switching, enabling or disabling is performed in response to an estimated user activity duration exceeding an estimated service activity duration based on the power consumption of the RAT supporting the user activity.

In various embodiments, an activity profiler module (APM) may maintain an empirical power profile for each user activity executing on the wireless communications device.

In various embodiments, a user activity profiler module (UAPM) may store user activity usage patterns including time and duration of service activities, and may provide a predictive model for future user activity usage characteristics.

Various embodiments may include determining whether an estimated user activity duration as calculated from the UAPM exceeds an estimated service activity duration as calculated based on information contained in the APM and the current battery state.

In various embodiments the wireless communication device may access the APM to identify RATs that if selected to support a user activity, will provide an estimated service activity duration that is longer the estimated user activity duration.

FIG. 1 illustrates a wireless network system 100 suitable for use with various embodiments. Wireless communication devices 102, 104 may be configured to establish wireless connections with cell towers or base stations of one or more radio access networks. For example, the wireless communication devices 102, 104 may transmit/receive data using base stations 106, 108, which may be part of a network 110, as is known in the art. The wireless communication device 102 may further be configured to transmit/receive data through base station 112, which may be part of a different network 114.

The wireless networks 110, 114 may be cellular data networks, and may use channel access methods including, but not limited to, Frequency Division Multiple Access (FDMA), Time Division Multiple Access (TDMA), Code Division Multiple Access (CDMA), Universal Mobile Telecommunications Systems (UMTS) (particularly, Long Term Evolution (LTE)), Global System for Mobile Communications (GSM), Wi-Fi, PCS, or other protocols that may be used in a wireless communications network or a data communications network. The networks 110, 114 may use the same or different wireless interfaces and/or physical layers. In some embodiments, the base stations 106, 108, 112 may be controlled by one or more base station controllers (BSC) 116, 118. For example, the base stations 106, 108, the BSC 116, and other components may form the network 110, as is known in the art. Alternate network configurations may also be used and the embodiments are not limited to the configuration illustrated. For example, in some embodiments the functionality of the BSC 116 and at least one of the base stations 106, 108 may be collapsed into a single "hybrid" module having the functionality of these components.

In various embodiments, the wireless communication device 102 may simultaneously access core networks 120, 122 after camping on cells managed by the base stations 106, 112. The wireless communication device 102 may also establish connections with Wi-Fi access points, which may connect to the Internet. While various embodiments are particularly useful with wireless networks, the embodiments are not limited to wireless networks and may be implemented over wired networks with no changes to the methods.

In the wireless network system 100, the wireless communication device 102 may be a multi-RAT wireless communication device that is capable of operating on a plurality of subscriptions. For example, the wireless communication device 102 may be a dual-subscription wireless communication device. Using dual-subscription functionality, the wireless communication device 102 may simultaneously access two core networks 120, 122 by camping on cells managed by the base stations 106, 112. The core networks 120, 122 may be interconnected by public switched telephone network (PSTN) 124, across which the core networks 120, 122 may route various incoming and outgoing communications to the wireless communication device 102.

The wireless communication device 102 may make a voice or data call to a third party device, such as wireless communication device 104, using one of the subscriptions. The wireless communication device 102 may also receive a voice call or other data transmission from a third party. The third party device (e.g., wireless communication device 104) may be any of a variety of devices, including, but not limited to, a mobile phone, laptop computer, server, etc.).

Some or all of the wireless communication devices 102 may be configured with multi-mode capabilities and may include multiple transceivers for communicating with different wireless networks over different wireless links/radio access technologies. In particular, the wireless communication device 102 may be configured with multi-RAT capability that enables a wireless communication device to simultaneously participate in two (or more) independent communications sessions.

Figure 2:
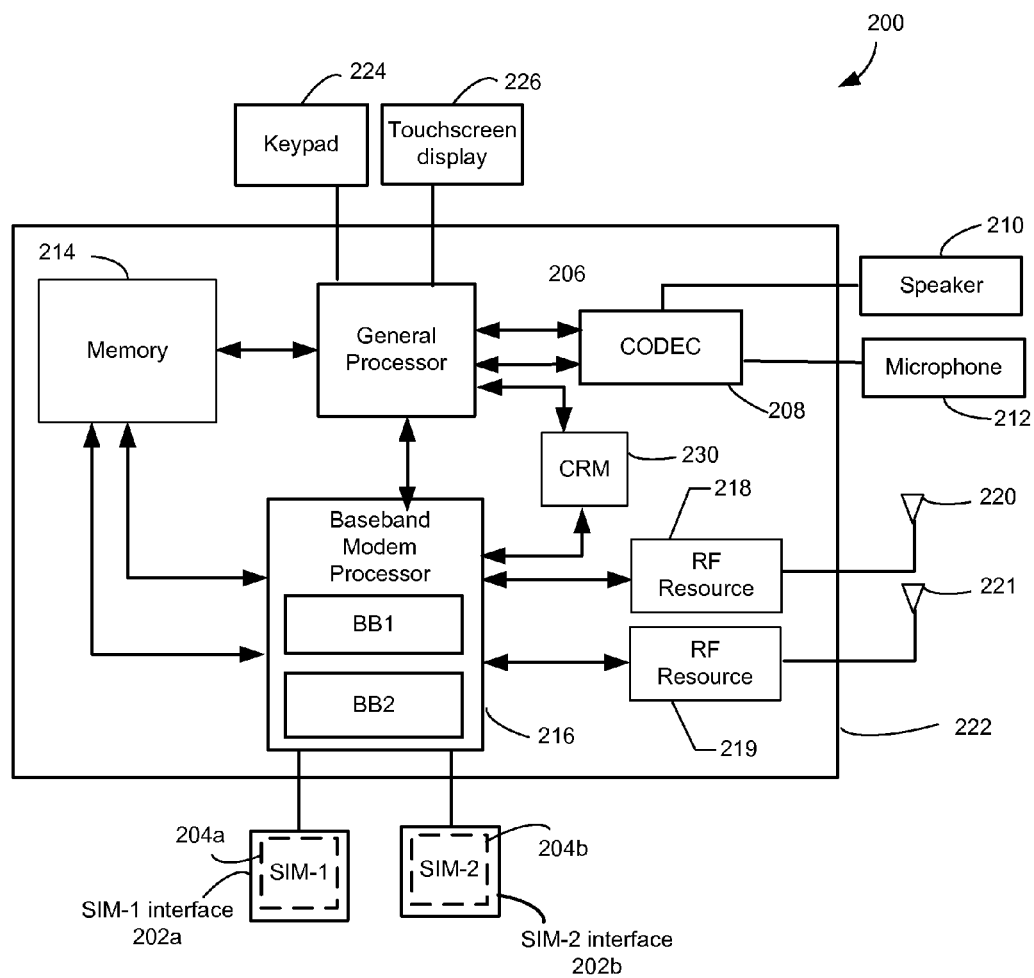
FIG. 2 is a block diagram illustrating a multi-RAT wireless communications device according to various embodiments.

FIG. 2 is a functional block diagram of an example multi-RAT wireless communication device 200 that is suitable for implementing various embodiments. With reference to FIGS. 1-2, in various embodiments, the wireless communication device 200, which may be similar to the wireless communication devices 102, 104 as described, may include a first subscription interface 202a, which may receive a first identity module subscription 204a that is associated with the first subscription. The wireless communication device 200 may also include a second subscription interface 202b, which may receive a second identity module subscription 204b that is associated with the second subscription.

A subscription in various embodiments may be a Universal Integrated Circuit Card (UICC) that is configured with subscription and/or Universal SIM (USIM) applications, enabling access to GSM and/or UMTS networks. The UICC may also provide storage for a phone book and other applications. Alternatively, in a CDMA network, a subscription may be a UICC removable user identity module (R-UIM) or a CDMA subscriber identity module (CSUBSCRIPTION) on a card.

Each subscription 204a, 204b may have a CPU, ROM, RAM, EEPROM and I/O circuits. One or more of the subscription s 204a, 204b used in various embodiments may contain user account information, an IMSI a set of subscription application toolkit (SAT) commands and storage space for phone book contacts. One or more of the subscription s 204a, 204b may further store home identifiers (e.g., a System Identification Number (SID)/Network Identification Number (NID) pair, a Home PLMN (HPLMN) code, etc.) to indicate the subscription network operator provider. An Integrated Circuit Card Identity (ICCID) subscription serial number may be printed on one or more of the subscription s 204a, 204b for identification.

The wireless communication device 200 may include at least one controller, such as a general purpose processor 206, which may be coupled to a coder/decoder (CODEC) 208. The CODEC 208 may in turn be coupled to a speaker 210 and a microphone 212. The general purpose processor 206 may also be coupled to at least one memory 214. Memory 214 may be a non-transitory tangible computer readable storage medium that stores processor-executable instructions. For example, the instructions may include routing communication data relating to the first or second subscription though a corresponding baseband-RF resource chain. The memory 214 may store operating system (OS), as well as user application software and executable instructions.

The general purpose processor 206 and memory 214 may each be coupled to at least one baseband modem processor 216. Each subscription in the wireless communication device 200 may be associated with a baseband-RF resource chain that includes a baseband modem processor 216 and a radio resource/RF resource 218, 219. In some embodiments, the wireless communication device may have additional RF resources, such as a third radio resource or more. The RF resources 218, 219 may be coupled to antennas 220, 221, and may perform transmit/receive functions for the wireless services associated with each subscription of the wireless communication device 200. In some embodiments, the RF resources 218, 219 may be coupled to wireless antennas 220, 221 for sending and receiving RF signals for the subscriptions thereby enabling the wireless communication device 200 to perform simultaneous communications with separate networks and/or service associated with the subscriptions. The RF resources 218, 219 may provide separate transmit and receive functionality, or may include a transceiver that combines transmitter and receiver functions. In some embodiments, a central resource manager 230 may be implemented in the general purpose processor 206 or baseband processor 216 in order to enable protocol implementation on the multiple subscriptions of the device. The central resource manager 230 may be a module that facilitates protocol stack functionality.

In some embodiments, the general purpose processor 206, memory 214, baseband modem processor(s) 216, and RF resources 218, 219 may be included in a system-on-chip device 222. The first and second subscription s 204a, 204b and their corresponding interfaces 202a, 202b may be external to the system-on-chip device 222. Further, various input and output devices may be coupled to components of the system-on-chip device 222, such as interfaces or controllers. Example user input components suitable for use in the wireless communication device 200 may include, but are not limited to, a keypad 224 and a touchscreen display 226.

In some embodiments, the keypad 224, touchscreen display 226, microphone 212, or a combination thereof, may perform the function of receiving the request to initiate an outgoing call. For example, the touchscreen display 226 may receive a selection of a contact from a contact list or receive a telephone number. In another example, either or both of the touchscreen display 226 and microphone 212 may perform the function of receiving a request to initiate an outgoing call. For example, the touchscreen display 226 may receive selection of a contact from a contact list or receive a telephone number. As another example, the request to initiate the outgoing call may be in the form of a voice command received via the microphone 212. Interfaces may be provided between various software modules and functions in the wireless communication device 200 to enable communication between them.

FIG. 3A illustrates an example of a SPM data structure 300 that may be maintained by a service profiler module (SPM) according to various embodiments. With reference to FIGS. 1-3A, the SPM data structure 300 may be implemented in hardware or software of the wireless communication device 200. Various embodiments may include a SPM that monitors power consumption by multiple services. A SPM data structure 300 (e.g., a table) may store information for one or more services and combinations of services 302 and an average power consumption rate 304 associated with each of the services or combinations of services 302. The SPM may contain information on all combination permutations of service combinations and the associated power consumption information may be independent of any specific user activity. This information may be utilized by a processor of the wireless communication device to determine how much power may be saved by disabling one or more services 302 (e.g., a combination of services).

The SPM data structure 300 may be empty prior to initial activation of the wireless communications device 200. Upon activation of the wireless communications device 200, the process may begin to monitor the power consumption of services supported by the various RATs. Information about the power consumption habits of these services or combinations of services 302 may be stored in a storage profiler module data structure 300. Such information may include a moving average of power consumption by specific services or combinations of services 302. In the example illustrated in FIG. 3A, an example average power consumption for a Wi-Fi service may be 0.2 watts while an average power consumption for a Bluetooth service may be 0.15 watts. Power consumption information may be updated at regular intervals or on an ad hoc basis.

In various embodiments, the information stored in the SPM data structure 300 may be used by the processor to determine the services that may be switched off (i.e., disabled) to achieve power savings. In the illustrated example, a processor may determine that Wi-Fi services should be disabled before Bluetooth services due to the higher power consumption savings achieved by disabling Wi-Fi. In some embodiments, a service may be selected for disablement based on the minimum power savings needed in order to maintain an activity for the estimated user activity duration. In other embodiments, the service offering the greatest power savings may be selected for disablement regardless of the required power of the user activity. Switching off of services will be discussed in further detail with reference to FIG. 6.

FIG. 3B illustrates an example of an APM data structure 310 of an activity profiler module (APM) according to various embodiments. With reference to FIGS. 1-3B, the APM data structure 310 may be implemented in hardware or software of the wireless communication device 200. Various embodiments may include an APM for determining the average power consumption of a specific activity camped on a specific RAT. The APM may monitor power consumption during execution of activities requiring the use of one or more RATs. An APM data structure 310 may store activity indicator 312 data and supporting services 318, associated power consumption 320 for each service option on the RAT 314 on which the user activity is camped, and signal conditions 316 present during monitoring of the user activity. This information may be used by a processor of the wireless communication device to determine current power consumption needs of an activity camped on a particular RAT. The determination may be based on historic needs of the user activity when executing under similar conditions.

In various embodiments, a processor may use the APM to monitor activity power resource needs. An APM data structure 310 may store information about the activities monitored by the APM. Information monitored and stored by the APM may include a specific type of activity, as denoted by an activity indicator 312, a RAT 314 on which the user activity is camped for the current monitoring session, signal conditions 316 that the RAT experiences at the time of monitoring, services 318 enabled for the given RAT, and power consumption 320 of the user activity associated with each of the service options. Activities may include voice calls, data calls, media streaming, data transfer, and the like. Signal conditions may include a current signal strength in the form of a received signal strength indicator (RSSI) or other measure of the integrity of a received signal.

In use, the processor may compare information about a currently executing activity to information in the APM data structure 310 to find power consumption information for the same activity executing under the same or similar conditions. An entry representing the closest match to the currently executing activity may be used by the processor to estimate the power consumption needs of the currently executing activity. Thus, current average power consumption estimates may be based on historic data for the user activity camped on the current RAT. The power consumption estimate may be used to estimate a service activity duration representing the duration for which the user activity may be supported by the current RAT given the current battery state.

In various embodiments, the APM data structure 310 may be empty until the wireless communications device 200 is activated. The APM may begin monitoring as soon as activities are initiated on the wireless communication device. Unlike the SPM, the APM may not be immediately useful in predicting current activity needs based on historic data. The APM data structure 310 may be populated and tested before full implementation. This may include waiting until the moving averages of power consumption are established by enough data points to mathematically settle the average. In some embodiments, the accuracy of the APM's predictions may need to meet a certain threshold before the APM is fully implemented. For example, the processor of the wireless communication device may refrain from relying on the predictions of the APM (i.e., activity power consumption estimates) until the processor determines that 70% of the predictions produce accurate results.

FIG. 3C illustrates an example of a UAPM data structure 330 of a user activity profiler module (UAPM) according to various embodiments. With reference to FIGS. 1-3C, the UAPM data structure 330 may be implemented in hardware or software of the wireless communication device 200.

Various embodiments may include an UAPM that may monitor information about the duration 336 of a specific user activity (denoted by user activity indicators 332) under various operating conditions 334. The UAPM may store information about the specific contact/website/application/ or other activity, as denoted by a user activity indicator 332, and the user activity's average duration 336 under operating conditions 334. The processor of the wireless communications device 200 may utilize the information stored in UAPM data structure 330 to estimate a duration of time that a currently executing user activity is expected to last based on the historical average duration for that same user activity.

User activity indicators 332 may be provided for a specific user activity in order to provide information on how the user employs the wireless communication device 200 to support accurate modeling of user activity durations. For example, the UAPM may store a separate entry for every phone number associated with user voice calls. Entries may be further distinguished based on an operating condition 334 such as a time of day during which each user activity occurs, geographical locations where each activity is performed, and/or environmental conditions (e.g., level of background noise) when each activity is performed. Thus, one phone number may appear multiple times in the UAPM data structure 330 and may be associated with different operating conditions 334. Each of these entries may be associated with a different average duration. In this manner, the UAPM may provide specific information about the length of time that a user typically engages in a particular user activity. The prediction may account for a particular time of day and location, as well as communication conditions that are often experienced during the user activity.

In various embodiments, the UAPM may be used by a processor of the wireless communications device 200 to generate predictive estimates of the duration of a currently executing activity. These estimates may be used along with the average power consumption estimate for a specific activity (as provided by the APM) to estimate the power resources needed to maintain the executing user activity for the average user activity duration (i.e., the time needed for the user to complete that activity).

In various embodiments, the UAPM may be trained in a manner similar to that discussed with reference to FIG. 3B and the APM. Data may be collected and stored in the UAPM data structure 330, but may not be actively relied upon until predictive estimates reach a threshold accuracy level (e.g., 70%).

Figure 4:
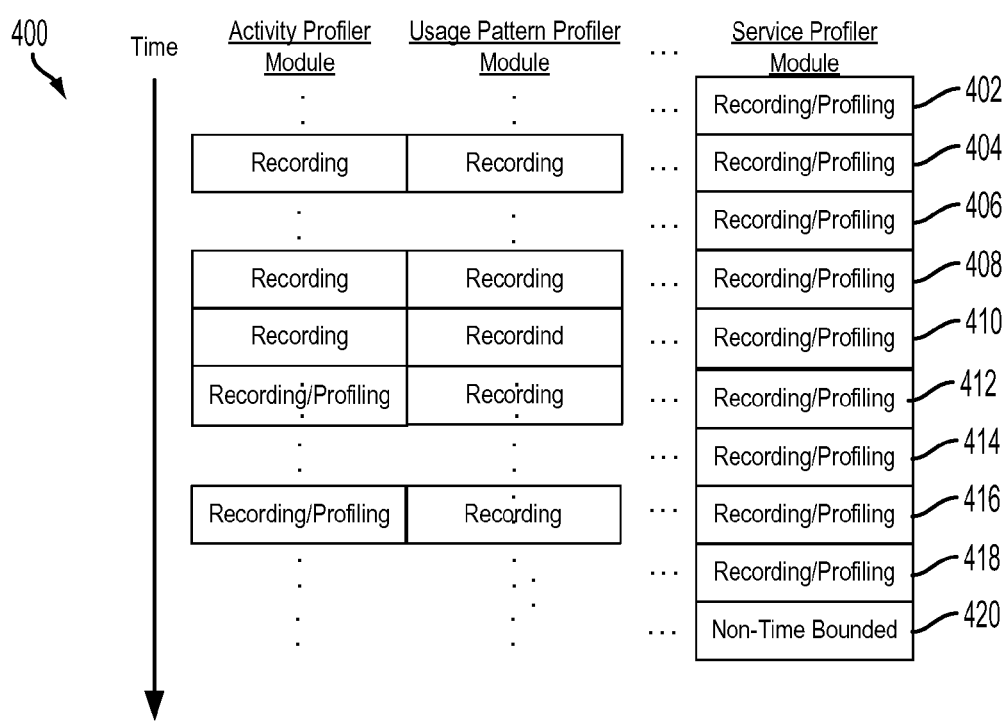
FIG. 4 is a diagram illustrating an exemplary module training timeline according to various embodiments.

FIG. 4 illustrates a timeline diagram 400 of training and implementation of the SPM, APM, and UAPM in a wireless communication device 200 according to various embodiments. With reference to FIGS. 1-4, the SPM, APM, and UAPM may be implemented in hardware or software of the wireless communication device 200. Various embodiments may include training one or more of the profiler modules utilizing machine learning techniques and data point aggregation to improve the accuracy of module predictions.

The SPM may not require training because it monitors power consumption by services or combinations of services independent of operating conditions or a specific activity. The SPM may begin SPM data structure 300 population as soon as the wireless communications device 200 begins operation. Thus, the SPM may be actively implemented and relied upon by the processor immediately after device initialization 402, and may continue recording data and profiling throughout device operations 404-420.

Unlike the SPM, the APM and UAPM may require training or more significant data aggregation before being relied upon for active profiling. These modules may begin recording (i.e., collecting data) when a user initiates an activity at a time 404 after initial activation 402 of the communications device. The UAPM and APM may continue recording data during any instance of activity execution (e.g., 404, 408-412, 416). However, the UAPM and APM may not begin active profiling or providing active estimations to the processor until these modules have recorded sufficient data or been trained to a determined accuracy level (such as a range between 65% and 80%). The accuracy requirement may be different for each module. Thus, the APM, which monitors general activity power consumption, may require fewer activity monitoring sessions to achieve desired accuracy levels than the UAPM. This is because the UAPM monitors sessions of specific user activities, which may occur less frequently than general activities. For example, the APM may monitor any instance of a data call, while the UAPM may monitor only data calls made to specific recipients. In FIG. 4, the APM is illustrated as achieving the desired accuracy level at time 412 after which the module begins active profiling (i.e., estimating) of activity power consumption needs. The UAPM may remain passive for a longer period as it continues to aggregate user activity information.

Figure 5:
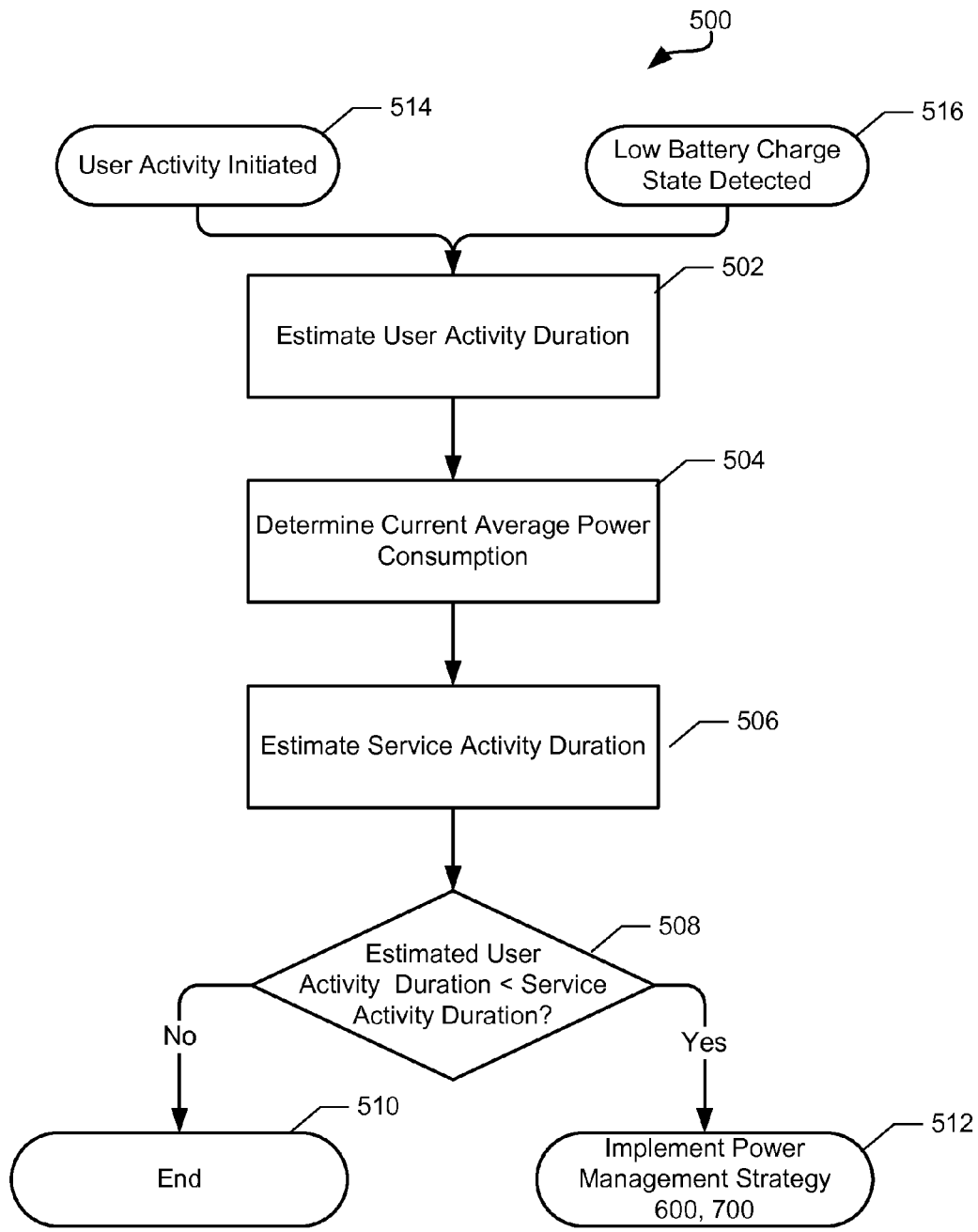
FIG. 5 is a process flow diagram illustrating a method of implementing a power management strategy according to various embodiments.

FIG. 5 illustrates a method 500 for managing power resources within a subscription according to various embodiments. The method 500 may be implemented with a processor (e.g., the general purpose processor 206 of FIG. 2, the baseband modem processor 216, a separate controller, and/or the like) of a mobile communication device (e.g., the multi-RAT wireless communication device 200 of FIG. 2). The method of managing power resources may be implemented any time a low battery charge state condition is detected 516 by the processor of the wireless communications device 200. Alternatively or in combination, the method 500 of managing power resources may be implemented whenever a user activity is initiated that requires the use of one or more RATs of the wireless communication device 200. Managing power requirements of a user activity may require active profiling by the UAPM, APM, and SPM (i.e., the modules fully trained and deployed).

In block 502, a communication device processor may estimate a user activity duration. The processor may access the UAPM data structure 330 to find an entry containing historical user activity usage pattern information (e.g., average user activity duration) for the initiated or currently executing user activity. As illustrated in FIG. 3C, a phone call to a particular phone number may have a user activity indicator 332 stored in the UAPM data structure 330. The processor may search the UAPM data structure 330 for a user activity indicator 332 matching the initiated or currently executing user activity. Upon locating one or more entries, the processor may compare current operating conditions to the operating conditions 334 stored in association with the relevant user activity indicator 332. If a direct match between current operating conditions and stored operating conditions 334 is found, the processor may determine that the associated average user activity duration 336 is the estimated user activity duration for the initiated or currently executed user activity (e.g., the estimated user activity duration). If a direct match is not found, the processor may update the UAPM to include an entry containing the current information, and may utilize the entry most closely matching the current operating conditions as the estimated user activity duration.

In block 504, a communication device processor may determine a current average power consumption for the initiated or currently executing user activity. The processor may access the APM to locate information about the historical power consumption of the initiated or currently executing user activity. As illustrated in FIG. 3B, the APM may have an APM data structure 310 that stores power consumption 320 information for activities, denoted by activity indicators 312 executing via specific services 318 on supporting RATs 31 and under specific signal conditions 316. Activity designations in the APM data structure 310 may be categorical, and thus broader than the user activity indicators 332 of the UAPM. Thus, the processor need only identify the type of activity in question (e.g., initiated or currently executing user activity) in order to search for power consumption information.

In an example, the processor may have an ongoing voice call and may search the APM data structure 310 for voice call related entries. The processor may then compare information about a currently camped RAT and any utilized services to information stored in the APM data structure 310 and associated with voice call. The processor may also determine whether signal conditions of the current RAT match the signal conditions 316 information stored by the APM. If a direct match between the user activity's currently camped RAT 314, supporting services 318, and signal conditions 316 is found then the processor may determine that the associated power consumption 320 is the current average power consumption for the initiated or currently executed activity. If a direct match is not found, the processor may update the APM to include an entry containing the current information, and may utilize the entry most closely matching the current RAT, services, and signal conditions.

In block 506, the processor may estimate a service activity duration for the current user activity. The estimated service activity duration may be the amount of time the communication device can maintain the initiated or currently executed user activity based on current RAT power consumption. Thus, estimation of the service activity duration may be a calculation of the amount of energy stored in the battery divided by the current power draw of the RAT (i.e., energy consumption rate) supporting the user activity. In some embodiments the energy remaining in the battery may be measured in units of power for a period of time such as watt-minutes or milliwatt-hours. In some embodiments, the average power consumption stored in both the APM and the SPM may be a unit of power (e.g., watt, or milliwatts). Thus, the division of the energy stored in the battery by the current power consumption results in units of time (e.g., minutes or hours). As such, the estimated service activity duration may be a measure of time in minutes, hours, or seconds that the battery can support the current power demand of the user activity using the current RAT.

In block 508, a communication device processor may determine whether the estimated user activity duration exceeds the estimated service activity duration. In response to determining that the time required to complete the user activity is not greater than the amount of time for which the device can maintain the user activity if camped on the current RAT. (i.e., determination block 508="No"), the processor may end power resource management in block 510. The user activity may continue to execute on the current RAT. In response to determining that the current estimated user activity duration exceeds the estimated service activity duration (i.e., determination block 508="Yes"), the processor may implement a power management strategy in block 512. A power management strategy may include one or both of switching the user activity to a more power efficient RAT (i.e., method 700, FIGS. 7A-7C) and/or disabling one or more services to reduce power consumption (i.e., method 600, FIG. 6) Implementation of a power management strategy will be described in further detail with reference to FIGS. 6-10.

Figure 6:
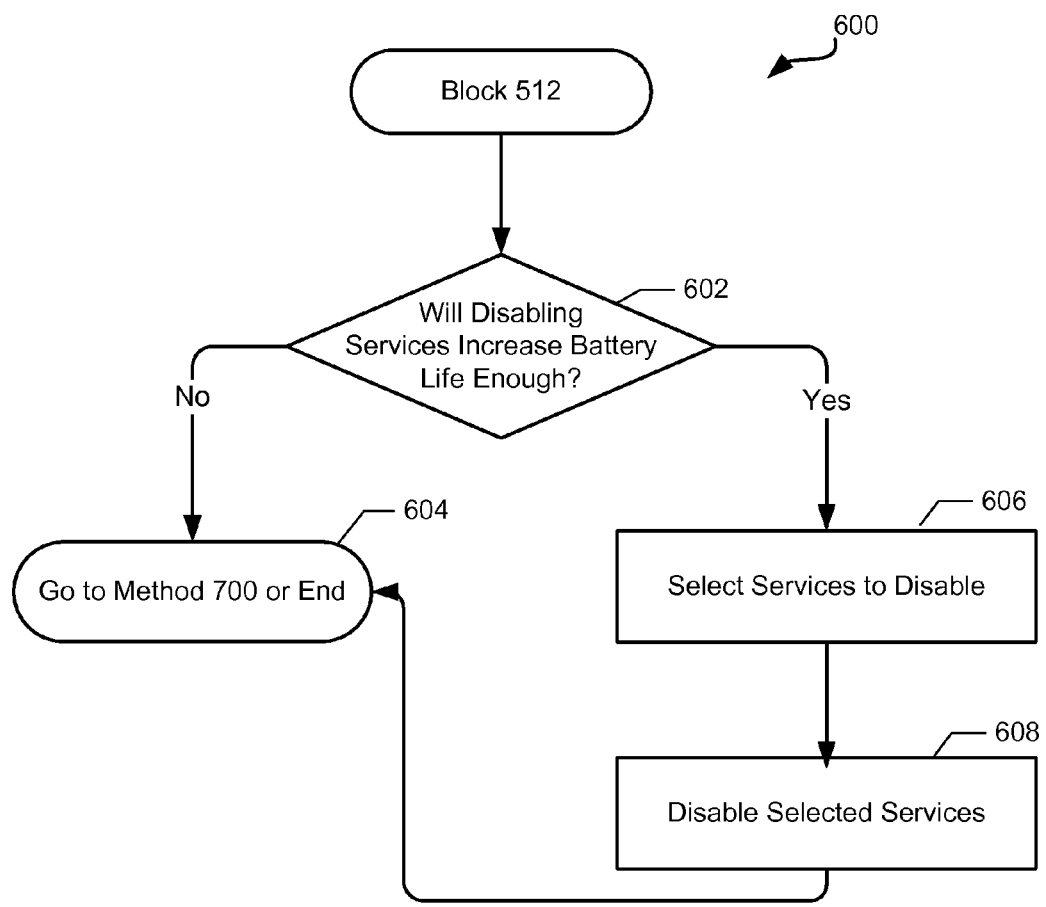
FIG. 6 is a process flow diagram illustrating a method of implementing a power management strategy according to various embodiments.

FIG. 6 illustrates a method 600 for implementing a power management strategy within a wireless communications device according to various embodiments. The method 600 may be implemented with a processor (e.g., the general purpose processor 206 of FIG. 2, the baseband modem processor 216, a separate controller, and/or the like) of a mobile communication device (e.g., the multi-RAT wireless communication device 200 of FIG. 2). With reference to FIGS. 1-6, implementing a power management strategy may include determining whether disabling services will result in a reduction in power consumption sufficient to enable the initiated or currently executing activity to execute for the estimated user activity duration. In various embodiments, the method 600 may be performed prior to, after, in parallel to, or in lieu of embodiment method 700 (FIGS. 7A-7C) for moving a user activity to a new RAT to improve power consumption.

In block 602, a communication device processor may determine whether disabling one or more services or service combinations will increase battery life enough (i.e., conserve enough power) to enable the battery to support the current user activity for the estimated user activity duration. The communications device may access the SPM to review average power consumption for each enabled service and/or service combinations 302. Historical information linking services and/or service combinations 302 with average power consumption 304 may be stored in the SPM data structure 300. The processor may check for services that are in a passive mode, are currently unused, or have lower priority than one or more services supporting the initiated or currently executing user activity. Thus, the processor may use the SPM to determine whether disabling any combination of services (those that can be turned off without disrupting the initiated or currently executing user activity) will result in a sufficient improvement to the remaining device battery life.

In block 606, the processor may select one or more services to disable in response to determining that disabling the one or more services will increase battery life enough to support the current user activity (i.e., determination block 602="Yes"). In some embodiments, the processor may disable all identified services to obtain the greatest amount of power savings. In some embodiments, the processor may disable only the combination of identified services that provides power savings closest to the difference between a current required device power or the estimated user activity duration, and the remaining energy stored in the battery. In some embodiments, the processor may disable any combination of services that will result in power savings greater than the difference between the current required device power or the estimated user activity duration, and the remaining energy stored in the battery.

In block 608, the communications device processor may disable the selected one or more services and continue executing the initiated or currently executing user activity on the current RAT. In some embodiments, the processor may end the power management strategy in block 604. In some embodiments, the processor may continue the power management strategy in an attempt to gain further power savings and may begin executing method 700.

In response to determining that there is no combination of services that can be disabled to achieve sufficient improvements to remaining battery life (i.e., determination block 602="No"), the processor may end the power management strategy or may attempt to move the initiated or currently executing user activity to a different RAT in block 604 (i.e., proceeding to method 700). Moving a user activity to a different RAT is described in further detail with reference to FIGS. 7A-10. In one example embodiment, the process 600 may be performed for a different RAT, where the disabling of the services for the different RAT may provide achieve sufficient improvement to the remaining battery life.

Figure 7A:
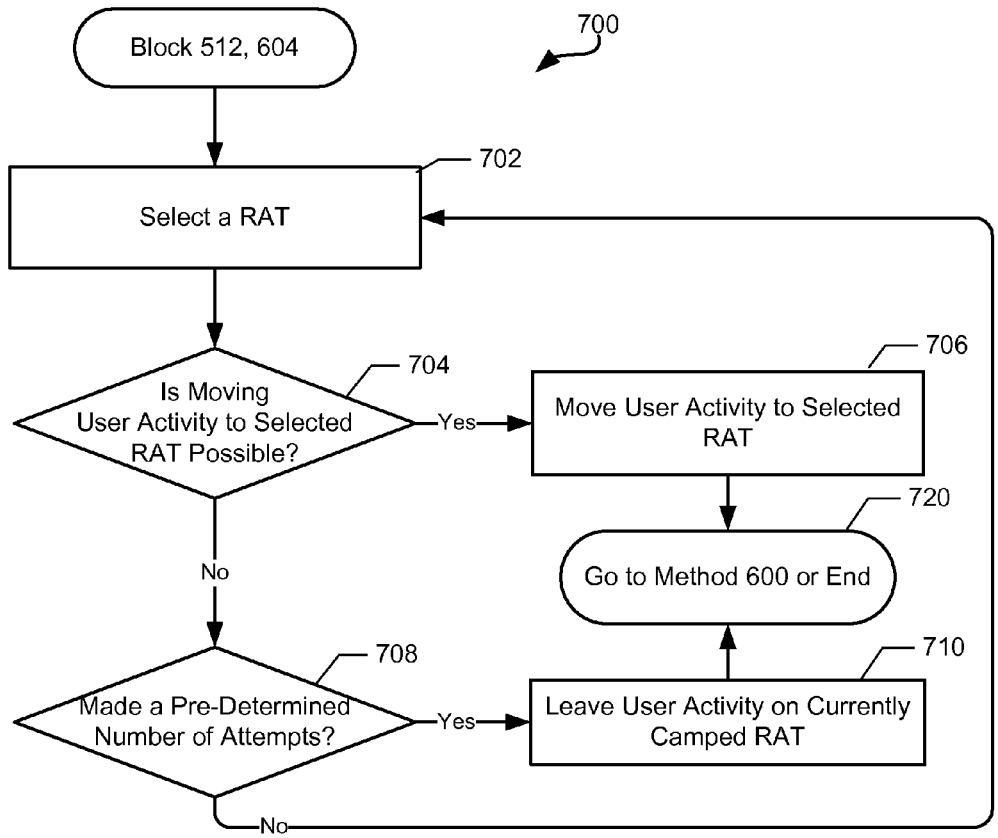
FIGS. 7A-7C are process flow diagrams illustrating embodiment methods of implementing a power management strategy according to various embodiments.
Figure 7B:
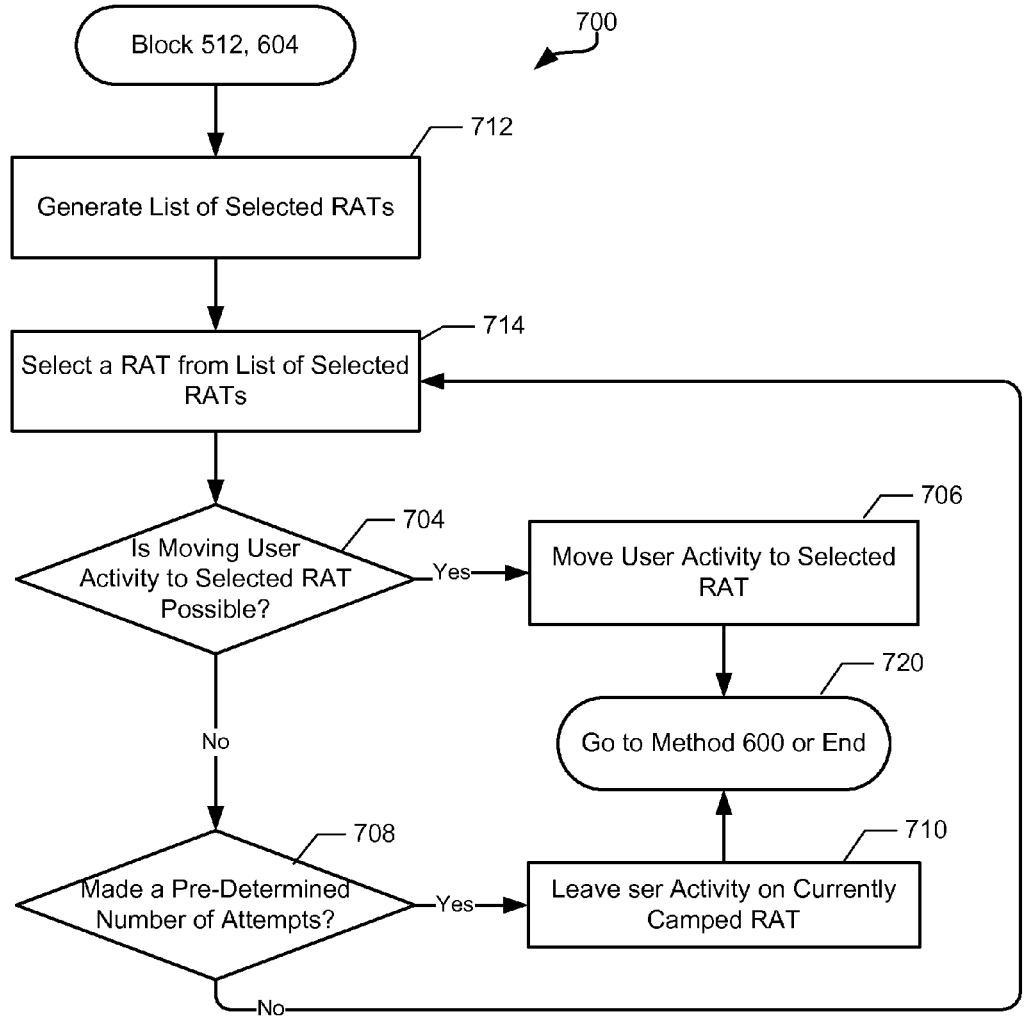
Figure 7C:
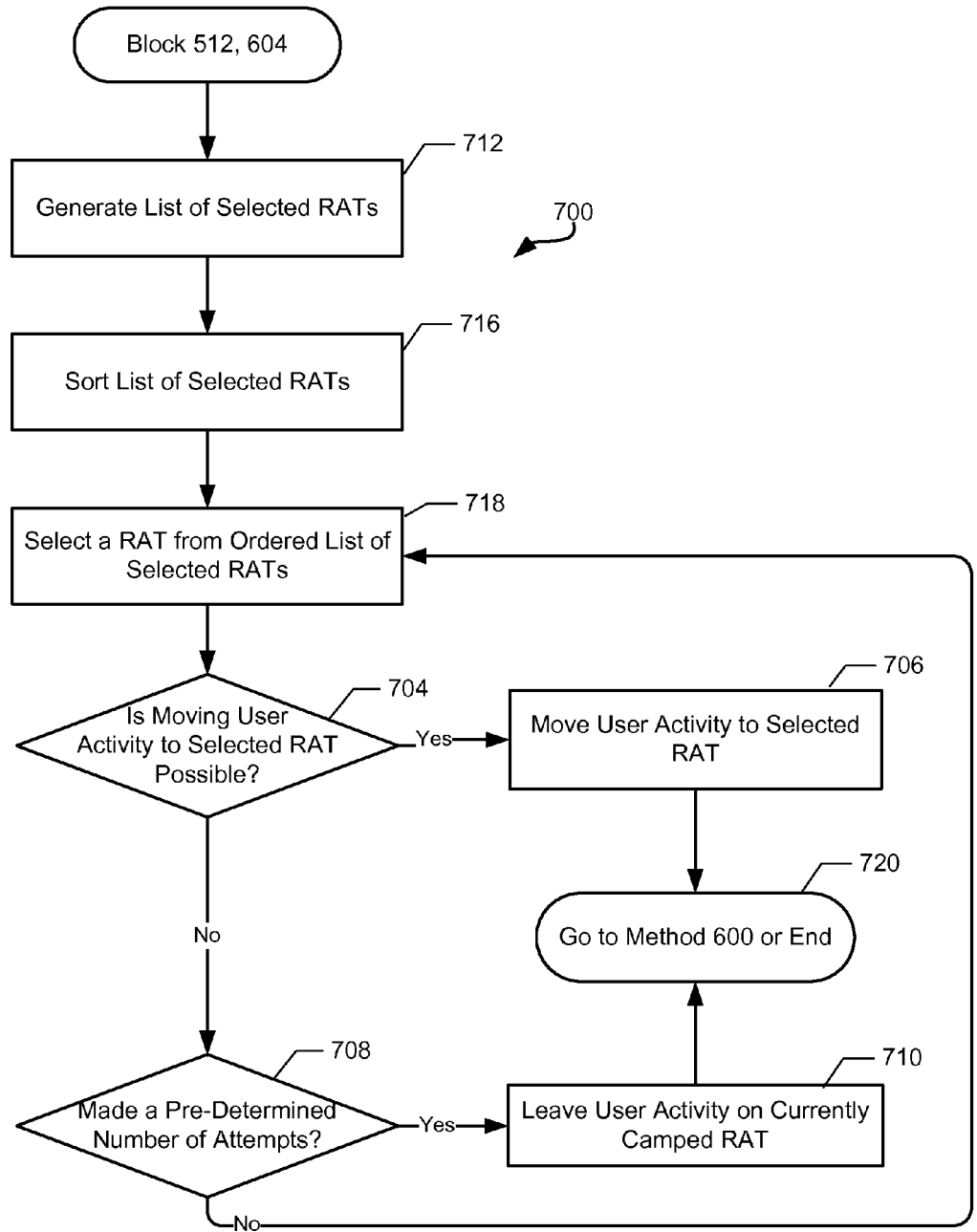

FIGS. 7A-7C illustrate embodiment methods 700a-700c for moving a user activity to a new RAT as part of implementing a power management strategy within a multi-RAT wireless communications device according to various embodiments. The methods 700 a-700c may be implemented with a processor (e.g., the general purpose processor 206 of FIG. 2, the baseband modem processor 216, a separate controller, and/or the like) of a mobile communication device (e.g., the multi-RAT wireless communication device 200 of FIG. 2). With reference to FIGS. 1-7C, moving a user activity to a new RAT as part of implementing a power management strategy may include selecting a different RAT and moving the initiated or currently executing user activity to the selected RAT. In various embodiments, methods 700a-700c may be executed by a processor prior to, after, in parallel with, or in lieu of method 600 for disabling services.

In method 700a illustrated in FIG. 7A, in block 702, a processor of the wireless communications device 200 may select a RAT other than the currently camped RAT. The processor may use the APM to select any RAT able to support the user activity and in accordance with embodiment methods for RAT selection (i.e., methods 800 and 900). The selection of RATs for attempted user activity moves will be described in further detail with reference to FIGS. 8A-9B.

In block 704, the processor may determine whether moving the initiated or currently executing user activity to the selected RAT is possible. The processor may base this determination on current signal conditions associated with the selected RAT. The determination of whether an activity can be moved to the selected RAT will be described in further detail with reference to FIG. 10.

In response to determining that it is possible to move the initiated or currently executing user activity to the selected RAT (i.e., determination block 704="Yes"), the processor may move the user activity to the selected RAT in block 706.

In response to determining that it is not possible to move the initiated or currently executing activity to the selected RAT (i.e., determination block 704="No"), the processor may determine whether it has made a pre-determined number of attempts to move the user activity to a different RAT in block 708. Alternatively, the processor may determine whether the wireless communications device 200 has attempted to move the user activity to all selectable RATs (e.g., those meeting selection requirements established in embodiment methods 800 and 900). If the processor has not made a pre-determined number of attempts (or exhausted all selectable RAT options) (i.e., determination block 708="No"), the processor may select another RAT in block 702. If the wireless communications device has made a pre-determined number of attempts (or exhausted all selectable RAT options) (i.e., determination block 708="Yes"), the processor may end the power management strategy and leave the initiated or currently executing user activity on the currently camped RAT in block 710.

In block 720, the processor of the computing device may end the power management strategy and continue execution of the user activity. In some embodiments, the processor may attempt to obtain further power savings by executing method 600 for disabling unnecessary services.

In method 700b illustrated in FIG. 7B, the wireless communications device processor may generate a list of selected RATs (i.e., viable RAT options), and rather than selecting RATs in an ad hoc or "one at a time" manner. Thus, in block 712 the wireless communications device processor may generate a list of selected RATs. Example methods of generating a list of selected RATs will be described in further detail with reference to FIGS. 8B and 9B. In block 714, the wireless communication device may select a RAT from the list of selected RATs. The processor may then execute the operations in blocks 704-720 as described with reference to FIG. 7A.

In method 700c illustrated in FIG. 7C, the wireless communications device processor may generate a list of selected RATs that is sorted or ordered after it is generated and prior to selection of a RAT. In some embodiments, the list of selected RATs may be ordered such that selected RATs are ranked based on the power savings that will result from moving the user activity to the selected RAT. Selected RATs may be ranked at the time of list generation. In some embodiments, such as the embodiment method 700c illustrated in FIG. 7C, the list of selected RATs may be sorted in block 716 after the list of selected RATs is generated in block 712, and prior to selection of a RAT from the list in determination block 714. The processor may then execute the operations in blocks 704-720 as described with reference to FIG. 7A.

Figure 8A:
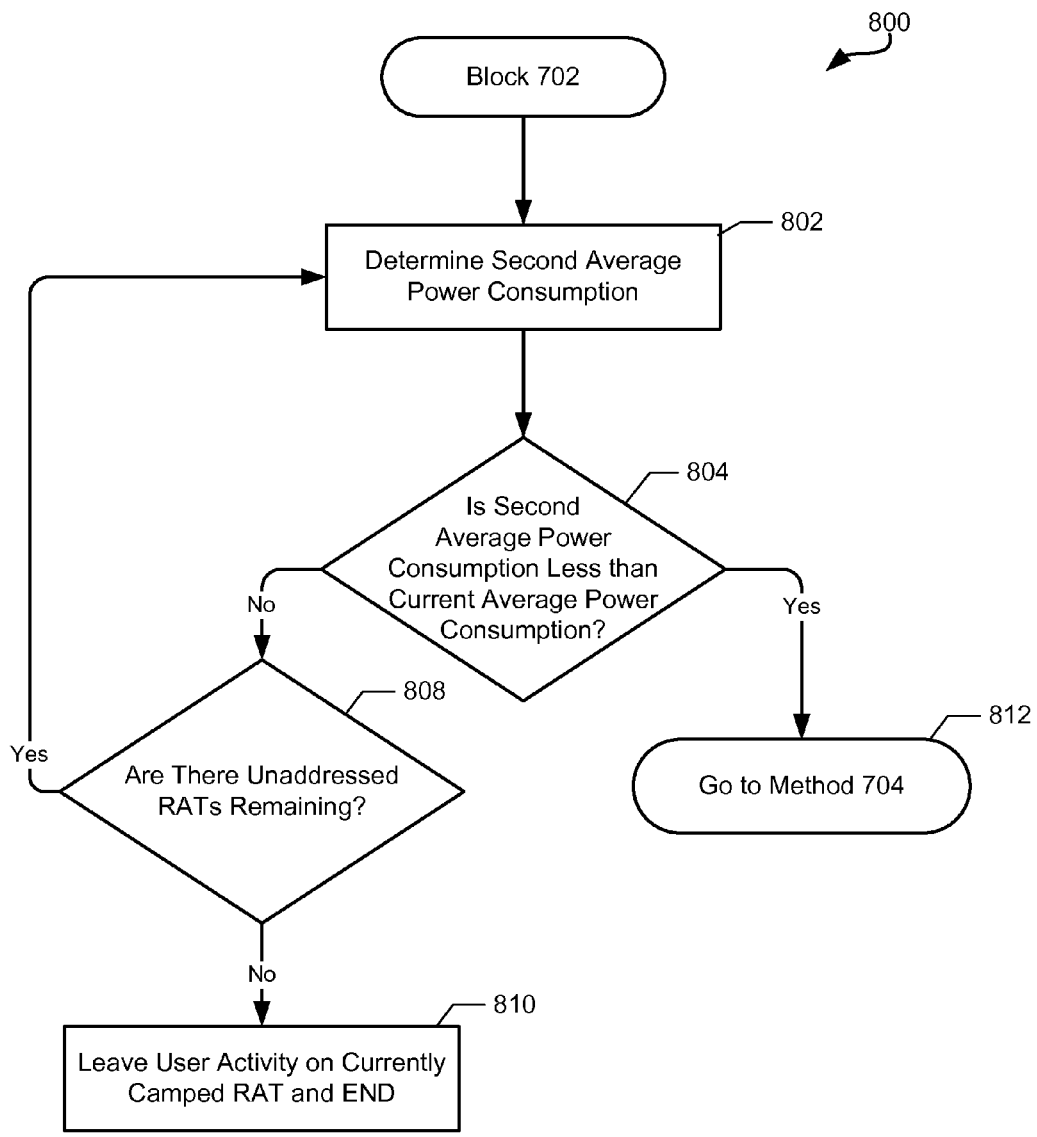
FIGS. 8A-8B are process flow diagrams illustrating embodiment methods of selecting a RAT according to various embodiments.
Figure 8B:
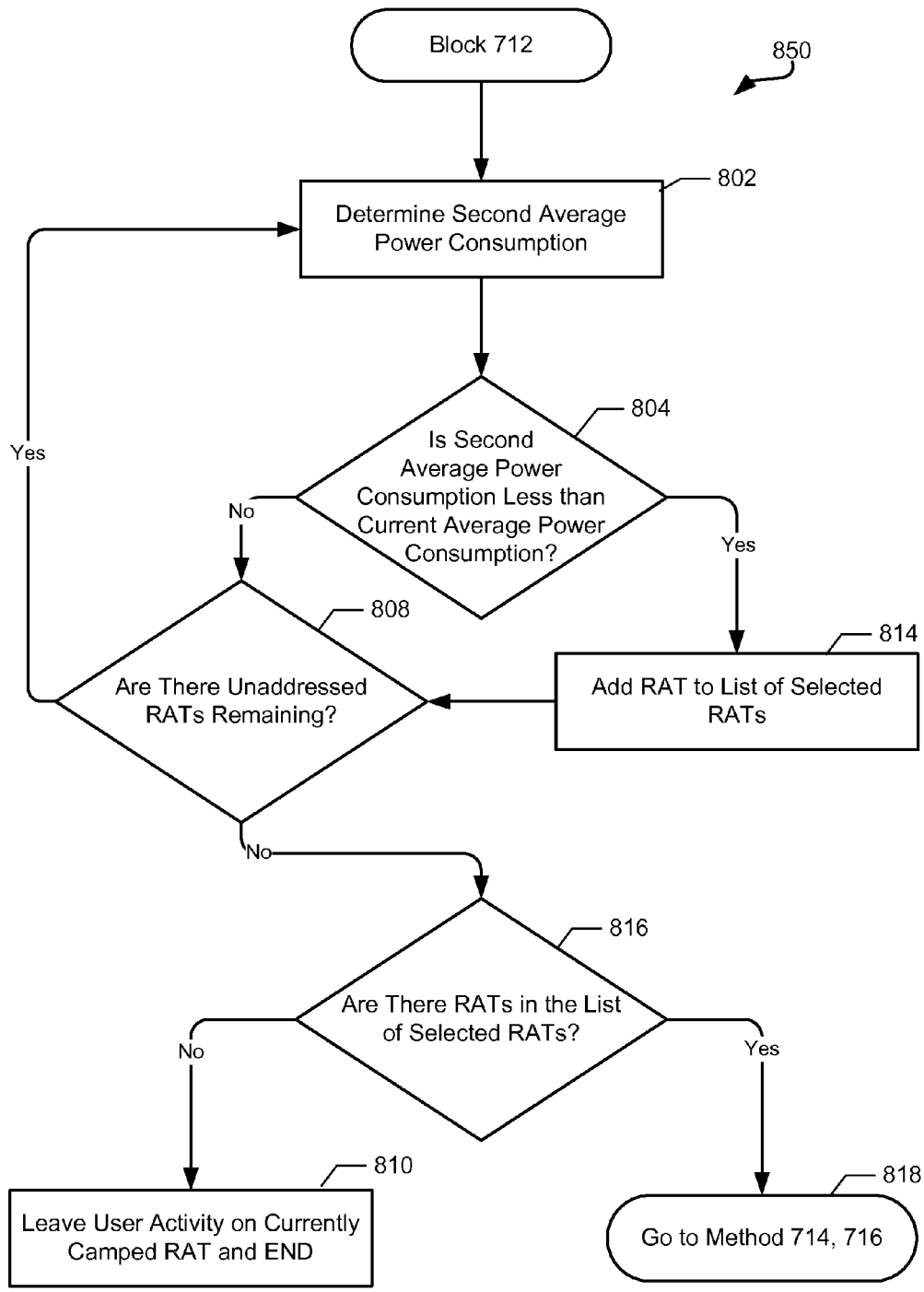

FIGS. 8A-8B illustrate embodiment methods 800, 850 for selecting a RAT or generating a list of selected RATs on which an activity may be re-camped within a subscription according to various embodiments. The methods 800, 850 may be implemented with a processor (e.g., the general purpose processor 206 of FIG. 2, the baseband modem processor 216, a separate controller, and/or the like) of a mobile communication device (e.g., the multi-RAT wireless communication device 200 of FIG. 2). With reference to FIGS. 1-8B, selecting a RAT on which the initiated or currently executing user activity may be camped may include accessing the APM to determine power consumption for each of the RAT alternatives.

With reference to FIG. 8A, method 800 is a process for selecting a RAT in accordance with block 702 of the method 700. Thus method 800 may replace block 702 of the method 700 illustrated in FIG. 7A.

In block 802, a communication device processor may determine a second average power consumption for a RAT other than the RAT on which the user activity is currently camped. The processor may select any RAT able to support the initiated or currently executing user activity and may determine a second average power consumption for the RAT (i.e., a RAT other than the RAT on which the user activity is currently camped). To make the determination, the processor may access the APM in a manner consistent with the discussion of block 504 of FIG. 5. The wireless communication device may review the APM data structure in any order to retrieve power consumption rates of RATs able to support the user activity. The average power consumption associated with camping the user activity on the other (i.e., second) RAT may depend on the supporting services and current signal conditions. In one example, the average power consumption associated with camping the user activity on the other RAT may further take into account disabling one or more services to further optimize power at the other RAT. The processor may use the information stored in the APM to determine the second average power consumption.

In block 804, a communication device may determine whether the second average power consumption is less than the current average power consumption. In embodiments such as those described with reference to FIGS. 8A and 8B, the wireless communications device may attempt to maintain the initiated or currently executing user activity as long as possible. In such embodiments, the wireless communications device may settle for merely prolonging the user activity duration rather than improving power sufficiently to maintain the user activity throughout the entire estimated user activity duration. Thus, the methods 800, 850 may only attempt to compare average power consumption rather than continue with evaluating sufficiency of battery life improvement.

If the second average power consumption is lower than the current average power consumption (i.e., determination block 804="Yes"), the processor may proceed to block 704 and may use the other (i.e., second) RAT as the selected RAT. In some embodiments, the processor may return to block 802 and repeat the method 800 until a RAT with the lowest average power consumption is found and then proceed to block 704. Such embodiments (not shown) may include determining whether the second average power consumption is less than the current average power consumption in block 804, as well as a best average power consumption (i.e., average power consumption associated with the RAT that will be selected if no better option is presented).

If the second average power consumption is greater than the current average power consumption (i.e., determination block 804="No"), the processor may determine whether there are any unaddressed RATs remaining in block 808. Unaddressed RATs may be remaining RATs for which an average power consumption has not yet been calculated.

In response to determining that there are unaddressed RATs remaining (i.e., determination block 808="Yes"), the processor may consider the next RAT in the APM data structure 310 and may determine a second average power consumption for the next (i.e., third) RAT in block 802. In response to determining that there are no more unaddressed RATs (i.e., determination block 808="No"), the processor may end the power management strategy in block 810 and leave the user activity camped on the current RAT. Thus, the selection of a RAT may continue until all options are exhausted or a suitable RAT is selected.

FIG. 8B illustrates a method 850 of generating a list of selected RATs according to block 712 of embodiment methods 700 illustrated in FIGS. 7B and 7C. The method 850 may be substantially similar to method 800, but may include additional operations related to populating a list of selected RATs rather than selecting one RAT at a time.

In block 802, a communications device processor may determine a second average power consumption as discussed in further detail with reference to FIG. 8A.

In block 804, the processor may determine whether the second average power consumption is less than a current average power consumption as discussed in further detail with reference to FIG. 8A.

In response to determining that the second average power consumption is less than the current average power consumption (i.e., determination block 804="Yes"), the processor may add the associated RAT to a list of selected RATs in block 814 and continue to block 808 of the method 850. In some embodiments (see FIG. 7B), RATs may be added to the list in a specific order. Such order may include a hierarchical ranking of RATs based on their associated average power consumption. For example, RATs might be added to the list in such a manner that the list is ordered ranking power consumption from lowest to highest or highest to lowest. Conversely, in some embodiments (see e.g., FIG. 7C) the processor may not sort RATs as they are added to the list because sorting is performed in block 716 of the method 700.

In block 808, the processor may determine whether there are any unaddressed RATs remaining as discussed in further detail with reference to FIG. 8A, block 808.

In response to determining that there are remaining unaddressed RATs (i.e., determination block 808="Yes"), the processor may return to block 802 and continue determining a second average power consumption for each viable RAT using the APM until all RAT options are exhausted.

In response to determining that there are no remaining unaddressed RATs (i.e., determination block 808="No"), the processor may determine whether there are any RATs listed in the list of selected RATs (i.e., has the list been populated or is it empty) in block 816. If no RATs were found that presented average power consumption better than the current power consumption, then the list may be empty (i.e., determination block 816="No"). In such a case, the processor may end the power management strategy in block 810 and leave the initiated or currently executing user activity camped on the current RAT. In response to determining that the list of selected RATs is not empty (i.e., determination block 816="Yes"), the processor may return to blocks 714 or 716 to continue implementing a power management strategy in block 818.

Figure 9A:
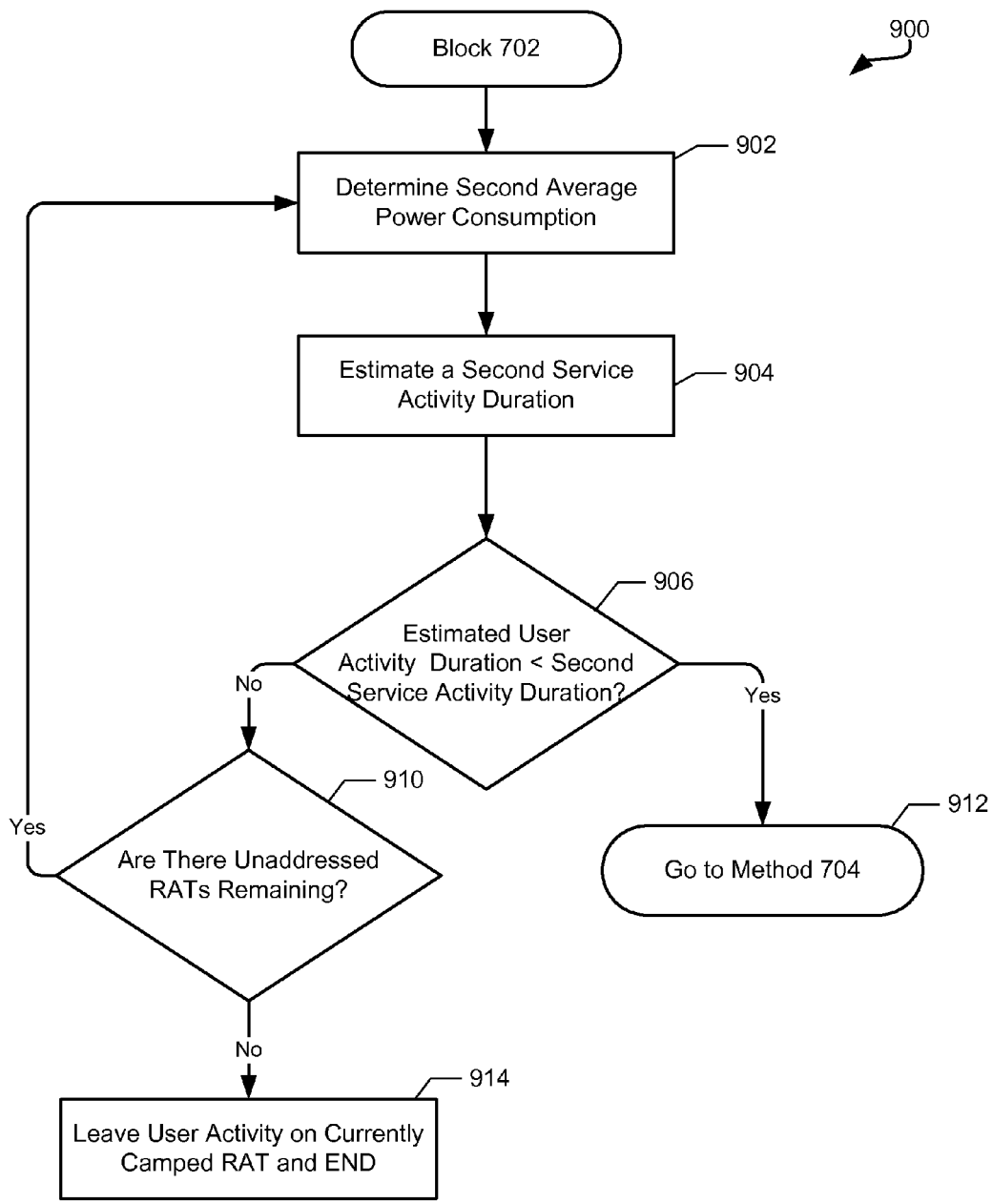
FIGS. 9A-9B are process flow diagrams illustrating embodiment methods of selecting a RAT according to various embodiments.
Figure 9B:
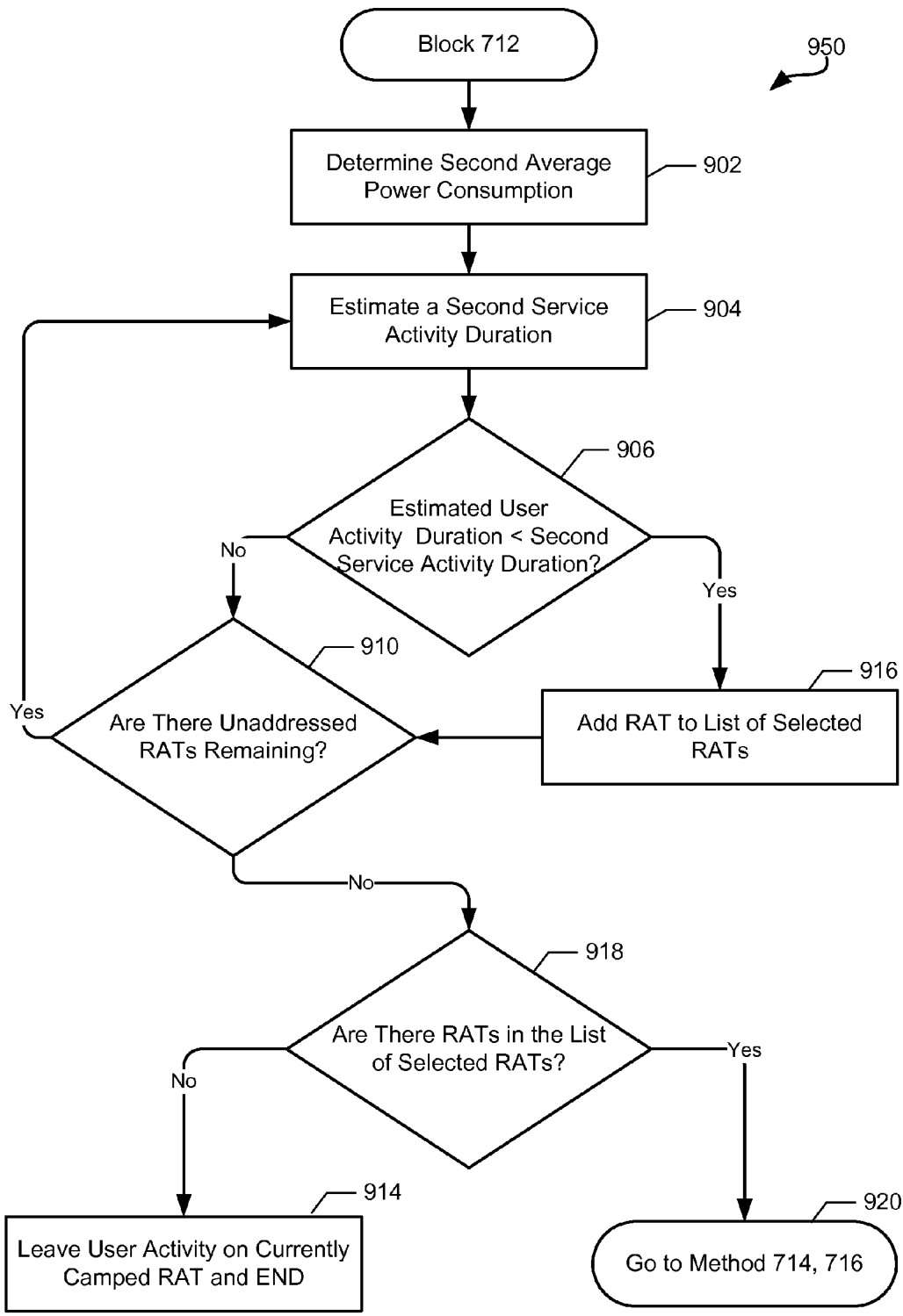

FIGS. 9A-9B illustrate embodiment methods 900, 950 for selecting a RAT or generating a list of selected RATs on which a user activity may be re-camped within a subscription according to various embodiments. The methods 900, 950 may be implemented with a processor (e.g., the general purpose processor 206 of FIG. 2, the baseband modem processor 216, a separate controller, and/or the like) of a mobile communication device (e.g., the multi-RAT wireless communication device 200 of FIG. 2).

With reference to FIGS. 1-9B, selecting a RAT on which the initiated or currently executing activity may be camped may include accessing the APM to determine a second average power consumption and estimating a service activity duration of each of the alternative RATs. Such embodiments may enable a wireless communications device to identify RATs to which the initiated or currently executing user activity may be moved. Alternative RATs offer power savings sufficient to maintain the user activity for the estimated user activity duration. Methods 900 and 950 focus on identifying a RAT that will provide sufficient power savings to support the user activity for the estimated user activity duration; and thus differ from methods 800 and 850, which focus on merely reducing power consumption to extend the duration for which the user activity may be supported.

FIG. 9A illustrates an embodiment method 900 for selecting a RAT according to block 702. Thus method 900 may replace block 702 of FIG. 7A.

In block 902, a communication device processor may determine a second average power consumption for the RAT. To make the determination, the processor may access the APM in the manner discussed in further detail with reference to FIG. 5, block 504, and FIG. 8A block 802.

In block 904, the processor may estimate a second service activity duration for the RAT. To make the estimation, the processor may divide the energy remaining in the device battery by the second average power consumption obtained in block 902. The second service activity duration may thus be estimated in the manner discussed in further detail with reference to FIG. 5, block 506.

In block 906, the processor may determine whether the estimated user activity duration exceeds the estimated second service activity duration in the manner discussed in further detail with reference to FIG. 5, block 508.

In response to determining that the estimated user activity duration is less than the estimated second service activity duration (i.e., determination block 906="Yes"), the processor may proceed to block 704 of method 704 and may utilize the RAT associated with the estimated second service activity duration as the selected RAT in block 912. In some embodiments, the processor may return to block 902 and repeat the method 900 until a RAT with the lowest estimated service activity duration exceeding the estimated user activity duration is found and may utilize the associated RAT as the selected RAT. Such embodiments (not shown) may include determining whether the current estimated user activity duration is less than the estimated second service activity duration, as well as a best service activity duration (i.e., service activity duration associated with the RAT that will be selected if no better option is presented).

In response to determining that the estimated user activity duration is not less than the estimated second service activity duration (i.e., determination block 906="No"), the processor may determine whether there are any unaddressed RATs remaining in block 910. In response to determining that there are unaddressed RATs remaining (i.e., determination block 910="Yes"), the processor may select another RAT and determine for that RAT a second average power consumption in block 902. In response to determining that there are no unaddressed RATs remaining (i.e., determination block 910="No"), the processor may end the power management strategy in block 914 and leave the user activity camped on the currently camped RAT.

FIG. 9B illustrates a method of generating a list of selected RATs in accordance block 712 of FIGS. 7B and 7C. The method 950 may be substantially similar to method 900 shown in FIG. 9A, but may include additional operations related to populating a list of selected RATs rather than selecting one RAT at a time.

In block 902, a communications device processor may determine a second average power consumption as discussed in further detail with reference to FIG. 5, block 504, and FIG. 8A, block 802.

In block 904, the processor may estimate a second service activity duration in the manner discussed in further detail with reference to FIG. 5, block 506 and FIG. 9A, block 904.

In block 906, the processor may determine whether the estimated user activity duration is less than an estimated second service activity duration in the manner discussed in further detail with reference to FIG. 5, block 508 and FIG. 9A, block 906.

In response to determining that the estimated user activity duration is less than the estimated second service activity duration (i.e., determination block 906="Yes"), the processor may add the associated RAT to a list of selected RATs in block 916. Embodiments consistent with the method 700 illustrated in FIG. 7B may optionally include adding RATs to the list in a specific order. An order may include a hierarchical ranking of RATs based on their associated estimated second service activity duration. For example, RATs might be added to the list in such a manner that the list is ordered based on estimated service activity duration from lowest to highest, or highest to lowest. Conversely, embodiments consistent with the method 700 illustrated in FIG. 7C will not sort RATs as the RATs are added to the list when sorting is performed in block 716 of the method 700.

In block 910, the processor may determine whether there are any unaddressed RATs remaining as discussed in further detail with reference to FIG. 9A, block 910.

In response to determining that there are remaining unaddressed RATs (i.e., determination block 910="Yes"), the processor may continue estimating second service activity durations of RATs using the APM in block 902 until all RAT options are exhausted.

In response to determining that there are no remaining unaddressed RATs (i.e., determination block 910="No"), the processor may determine whether there are any RATs listed in the list of selected RATs (i.e., has the list been populated or is it empty) in determination block 918.

In response to determining that no RATs were found that presented average power consumption better than the current power consumption (i.e., determination block 918="No"), in which case the list may be empty, the processor may end the power management strategy in block 914 and leave the initiated or currently executing user activity camped on the current RAT. In response to determining that the list of selected RATs is not empty (i.e., determination block 918="Yes"), the processor may return to blocks 714 or 716 in block 920.

Figure 10:
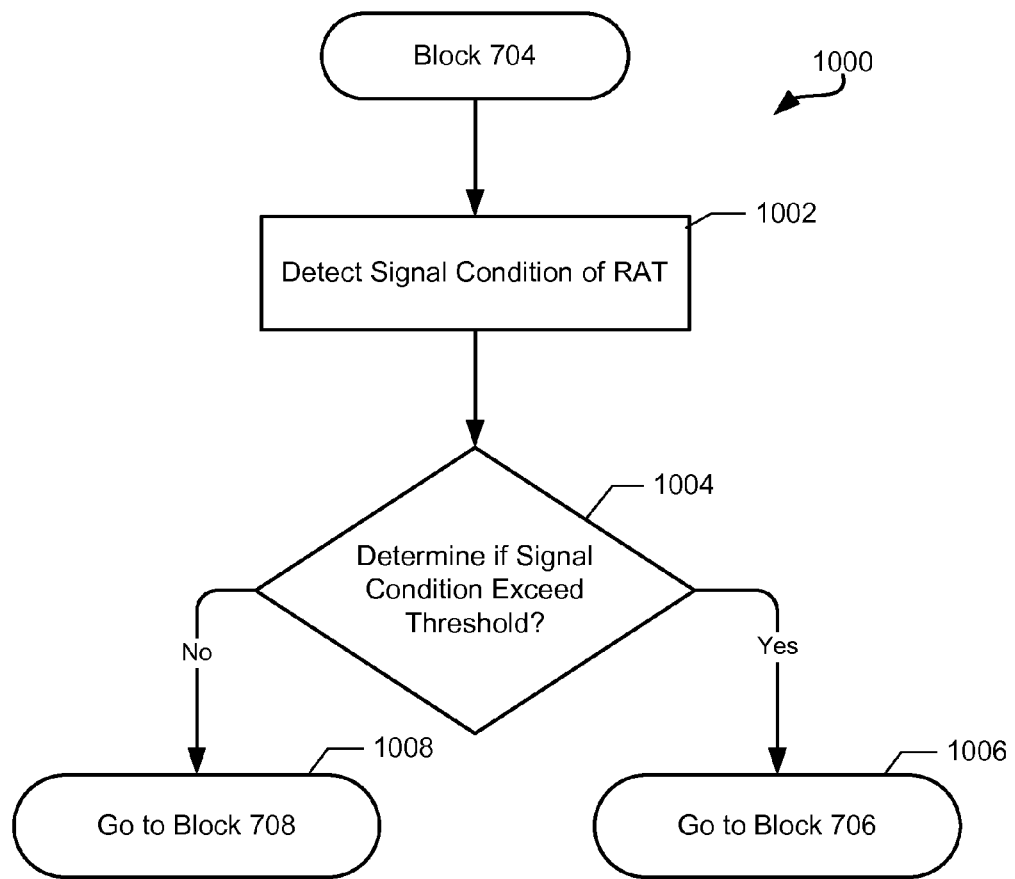
FIG. 10 is a process flow diagram illustrating a method of determining whether an activity may be moved to a different RAT according to various embodiments.

FIG. 10 illustrates an embodiment method 1000 for determining whether a user activity may be moved to a selected RAT within a subscription according to various embodiments. The methods 1000 may be implemented with a processor (e.g., the general purpose processor 206 of FIG. 2, the baseband modem processor 216, a separate controller, and/or the like) of a mobile communication device (e.g., the multi-RAT wireless communication device 200 of FIG. 2). With reference to FIGS. 1-10, determining whether an initiated or currently executing activity may be moved to a selected RAT may be based on current signal conditions experienced by the selected RAT.

In block 1002, a communications device processor may detect a current signal condition of the selected RAT. For example, the processor may detect an RSSI associated with the RAT or may obtain signal information from one or more transceivers or subscriptions of the wireless communication device.

In block 1004, the processor may determine whether the signal condition exceeds a threshold (e.g., a minimum signal strength). Inclusion of this operation reduces the likelihood that the power management strategy will move a user's activity to a weak signal that subsequently drops the user activity's communications.

In response to determining that the signal condition exceeds the signal threshold (i.e., determination block 1004="Yes"), the processor may proceed to block 706 of FIGS. 7A-7C in block 1006. In response to determining that the signal condition does not exceed the signal threshold (i.e., determination block 1004="No"), the processor may return to block 708 of FIGS. 7A-7C in block 1008.

In other words, the methods, devices, and non-transitory processor readable media for managing power resources in a multi-technology wireless communication device may include determining an estimated user activity duration for a user activity executing on the multi-technology wireless communication device based on historic user activity usage information. The historic user activity usage information may be obtained from the UAPM and may be a moving average of a user activity duration. The average may be determined by the UAPM, which monitors how a user utilizes communication device user activities and under what conditions the user activities are utilized. The UAPM is continuously trained and thus contained historic user activity usage information changes over time to reflect current user activity usage patterns. The communication device processor may determine a current average power consumption of the user activity based on historic power consumption needs of the user activity under current operating conditions for one or more radio access technologies (RATs) on which the user activity is camped. The historic power consumption information may be obtained from the APM, which monitors and models power consumption estimation for activities based on specific service/RAT combinations and operating conditions (e.g., signal strength). The communication device processor may further estimate a service activity duration based on the current average power consumption and the remaining device battery life. The communication device may also determine whether the estimated user activity duration exceeds the estimated service activity duration and may implement a power management strategy in response to determining that the estimated user activity duration exceeds the estimated service activity duration.

Figure 11:
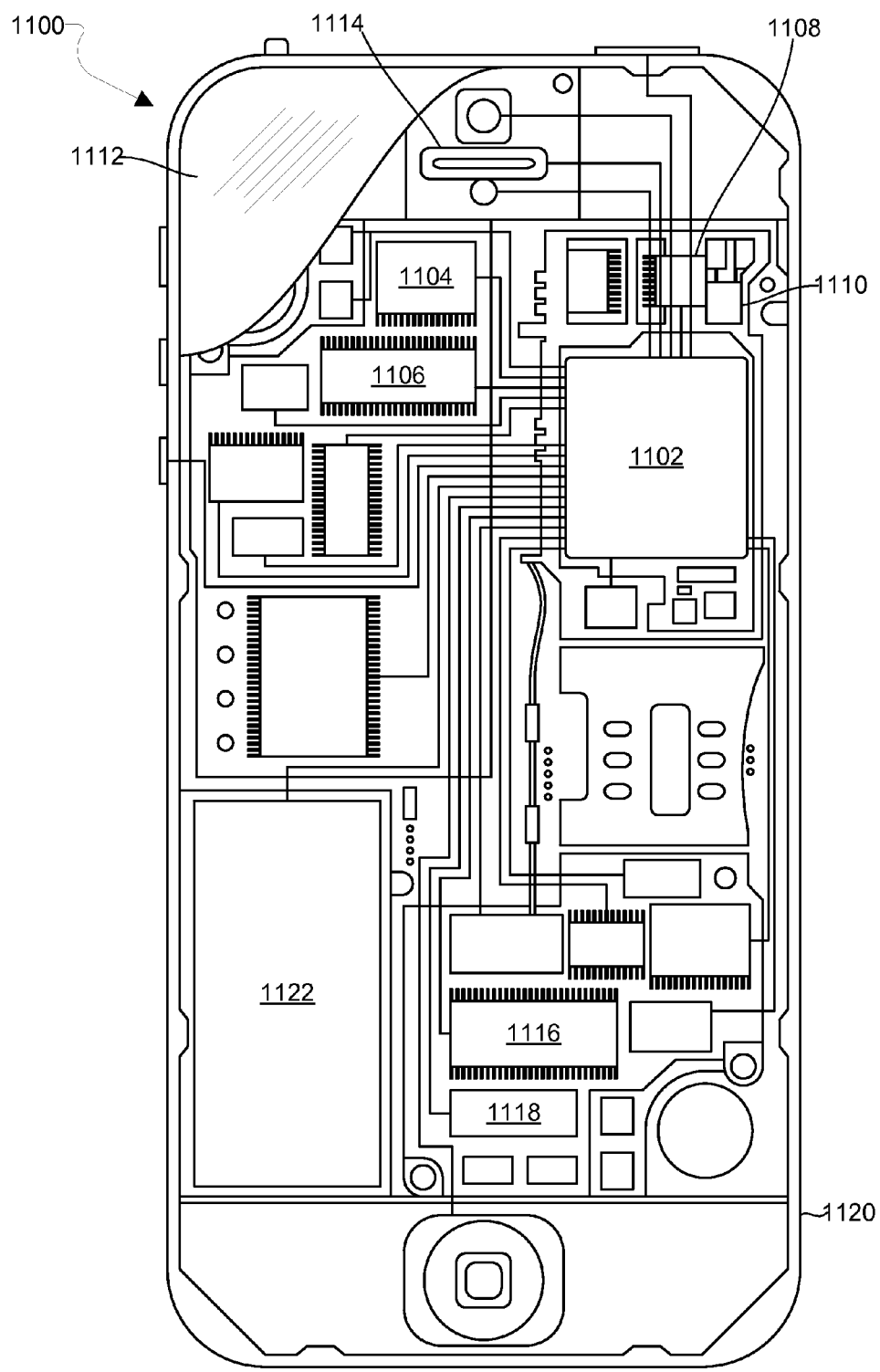
FIG. 11 illustrates a component block diagram of a mobile communication device suitable for use with various embodiments.

Various embodiments may be implemented in any of a variety of mobile communication devices, examples of which (e.g., a mobile communication device 1100) are illustrated in FIG. 11. In various embodiments, the mobile communication device 1100 may be similar to the mobile communication devices 106, 108, 200 as described with reference to FIGS. 1-2. As such, the mobile communication device 700 may implement the methods 500, 600, 700, 800, 850, 900, 950, and 1000 of FIGS. 5-10.

With reference to FIGS. 1-11, the mobile communication device 1100 may include a processor 1102 coupled to a touchscreen controller 1104 and an internal memory 1106. The processor 1102 may be one or more multi-core integrated circuits designated for general or specific processing tasks. The internal memory 1106 may be volatile or non-volatile memory, and may also be secure and/or encrypted memory, or unsecure and/or unencrypted memory, or any combination thereof. The touchscreen controller 1104 and the processor 1102 may also be coupled to a touchscreen panel 1112, such as a resistive-sensing touchscreen, capacitive-sensing touchscreen, infrared sensing touchscreen, etc. Additionally, the display of the mobile communication device 1100 need not have touch screen capability.

The mobile communication device 1100 may have two or more radio signal transceivers 1108 (e.g., Peanut, Bluetooth, ZigBee, Wi-Fi, RF radio) and antennae 710, for sending and receiving communications, coupled to each other and/or to the processor 1102. The transceivers 1108 and antennae 1110 may be used with the above-mentioned circuitry to implement the various wireless transmission protocol stacks and interfaces. The mobile communication device 1100 may include one or more cellular network wireless modem chip(s) 1116 coupled to the processor and antennae 1110 that enables communication via two or more cellular networks via two or more radio access technologies.

The mobile communication device 1100 may include a peripheral device connection interface 1118 coupled to the processor 1102. The peripheral device connection interface 1118 may be singularly configured to accept one type of connection, or may be configured to accept various types of physical and communication connections, common or proprietary, such as USB, FireWire, Thunderbolt, or PCIe. The peripheral device connection interface 1118 may also be coupled to a similarly configured peripheral device connection port (not shown).

The mobile communication device 1100 may also include speakers 1114 for providing audio outputs. The mobile communication device 1100 may also include a housing 1120, constructed of a plastic, metal, or a combination of materials, for containing all or some of the components discussed herein. The mobile communication device 1100 may include a power source 1122 coupled to the processor 1102, such as a disposable or rechargeable battery. The rechargeable battery may also be coupled to the peripheral device connection port to receive a charging current from a source external to the mobile communication device 1100. The mobile communication device 1100 may also include a physical button 1124 for receiving user inputs. The mobile communication device 1100 may also include a power button 1126 for turning the mobile communication device 1100 on and off.

The processor 1101 may be any programmable microprocessor, microcomputer or multiple processor chip or chips that can be configured by software instructions (applications) to perform a variety of functions, including the functions of various embodiments described below. In some wireless communication devices, multiple processors 1101 may be provided, such as one processor dedicated to wireless communication functions and one processor dedicated to running other applications. Typically, software applications may be stored in the internal memory 1102 before they are accessed and loaded into the processor 1101. The processor 1101 may include internal memory sufficient to store the application software instructions.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

While the terms "first" and "second" are used herein to describe data transmission associated with a subscription and data receiving associated with a different subscription, such identifiers are merely for convenience and are not meant to limit various embodiments to a particular order, sequence, type of network or carrier.

Various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, (e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method of managing power resources in a multi-technology wireless communication device, comprising:
   estimating a user activity duration for a user activity executing on the multi-technology wireless communication device based on historic user activity usage information;
   determining a current average power consumption of the user activity based on historic power consumption by the user activity under current operating conditions for a radio access technology (RAT) on which the user activity is camped;
estimating a service activity duration for the user activity based on at least the current average power consumption and a charge state of a battery;
determining whether the estimated user activity duration exceeds the estimated service activity duration; and
implementing a power management strategy in response to determining that the estimated user activity duration exceeds the estimated service activity duration by:
generating a list of available RATs;
calculating a second average power consumption based on historic power consumption needs of the user activity under the current operating conditions for at least one RAT of the list of available RATs;
determining whether moving the user activity to the at least one RAT is possible; and
moving the user activity to a selected RAT in response to determining that moving the user activity to the at least one RAT is possible.

2. The method of claim 1, wherein:
determining whether moving the user activity to the at least one RAT is possible includes comparing the second average power consumption to the current average power consumption; and
moving the user activity to the selected RAT in response to determining that moving the user activity to the at least one RAT is possible is also in response to determining that the second average power consumption is less than the current average power consumption.

3. The method of claim 1, further comprising:
estimating a second service activity duration for the user activity based on at least the second average power consumption and the charge state of the battery; and
determining whether the estimated user activity duration exceeds the estimated second service activity duration, wherein moving the user activity to the selected RAT in response to determining that moving the user activity to the at least one RAT is possible is also in response to determining that the estimated user activity duration does not exceed the estimated second service activity duration.

4. The method of claim 1, wherein determining whether moving the user activity to the at least one RAT is possible is based at least in part on a current signal condition of the selected RAT.

5. The method of claim 1, wherein generating the list of available RATs comprises:
determining an average power consumption associated with each available RAT based on historic power consumption needs of the user activity under the current operating conditions;
determining whether the average power consumption associated with each available RAT is less than the current average power consumption; and
adding to the list of available RATs any available RAT for which the associated average power consumption is less than the current average power consumption.

6. The method of claim 5, wherein
the RATs included in the list of available RATs are in an order based on average power consumption.

7. The method of claim 1, wherein generating the list of available RATs comprises:

determining an average power consumption associated with each available RAT based on historic power consumption needs of the user activity under the current operating conditions;
estimating a second service activity duration for the user activity for each available RAT based on at least the associated average power consumption and the charge state of the battery;
determining whether the estimated user activity duration exceeds the estimated second service activity duration for each available RAT; and
adding to the list of available RATs each available RAT for which the estimated user activity duration does not exceed the estimated second service activity duration.

8. The method of claim 7, wherein
the RATs included in the list of available RATs are in an order based on estimated service duration.

9. The method of claim 1, wherein implementing the power management strategy further comprises:
determining whether disabling one or more services will increase the duration that the battery can sustain the user activity for the estimated user activity duration based on historic power consumption for each service of the multi-technology wireless communication device; and
disabling one or more services in response to determining that disabling the one or more services will increase the duration that the battery can sustain the user activity for the estimated user activity duration.

10. The method of claim 1, wherein the method is executed in response to determining that a low battery condition exists.

11. The method of claim 1, wherein the selected RAT is chosen from the at least one RAT of the list of available RATs based at least in part on the second average power consumption.

12. The method of claim 1, wherein determining whether moving the user activity to the at least one RAT is based at least in part on the second average power consumption.

13. A multi-technology wireless communication device, comprising:
a battery;
a plurality of radio frequency (RF) resources configured to support a plurality of radio access technologies (RATs); and
a processor coupled to the battery and the plurality of RF resources, and configured to:
estimate a user activity duration for a user activity executing on the multi-technology wireless communication device based on historic user activity usage information;
determine a current average power consumption of the user activity based on historic power consumption by the user activity under current operating conditions for a RAT on which the user activity is camped;
estimate a service activity duration for the user activity based on at least the current average power consumption and a charge state of the battery;
determine whether the estimated user activity duration exceeds the estimated service activity duration; and
implement a power management strategy in response to determining that the estimated user activity duration exceeds the estimated service activity duration by:
generating a list of available RATs;
calculating a second average power consumption based on historic power consumption needs of the user activity under the current operating conditions for at least one RAT of the list of available RATs;

determining whether moving the user activity to the at least one RAT is possible; and moving the user activity to a selected RAT in response to determining that moving the user activity to the at least one RAT is possible.

14. The multi-technology wireless communication device of claim 13, wherein:

determining whether moving the user activity to the at least one RAT is possible includes comparing the second average power consumption to the current average power consumption; and moving the user activity to the selected RAT in response to determining that moving the user activity to the at least one RAT is possible is also in response to determining that the second average power consumption is less than the current average power consumption.

15. The multi-technology wireless communication device of claim 13, wherein the processor is further configured to configured to:

estimate a second service activity duration for the user activity based on at least the second average power consumption and the charge state of the battery; and determine whether the estimated user activity duration exceeds the estimated second service activity duration, wherein moving the user activity to the selected RAT in response to determining that moving the user activity to the at least one RAT is possible is also in response to determining that the estimated user activity duration does not exceed the estimated second service activity duration.

16. The multi-technology wireless communication device of claim 13, wherein determining whether moving the user activity to the at least one RAT is possible is based at least in part on a current signal condition of the selected RAT.

17. The multi-technology wireless communication device of claim 13, wherein generating the list of available RATs comprises:

determining an average power consumption associated with each available RAT based on historic power consumption needs of the user activity under the current operating conditions;

determining whether the average power consumption associated with each available RAT is less than the current average power consumption; and adding to the list of available RATs any available RAT for which the associated average power consumption is less than the current average power consumption.

18. The multi-technology wireless communication device of claim 17, wherein the RATs included in the list of available RATs are in an order based on average power consumption.

19. The multi-technology wireless communication device of claim 13, wherein generating the list of available RATs comprises:

determining an average power consumption associated with each available RAT based on historic power consumption needs of the user activity under the current operating conditions;

estimating a second service activity duration for the user activity for each available RAT based on at least the associated average power consumption and the charge state of the battery;

determining whether the estimated user activity duration exceeds the estimated second service activity duration for each available RAT; and adding to the list of available RATs each available RAT for which the estimated user activity duration does not exceed the estimated second service activity duration.

20. The multi-technology wireless communication device of claim 19, wherein the RATs included in the list of available RATs are in an order based on estimated service duration.

21. The multi-technology wireless communication device of claim 13, wherein implementing the power management strategy further comprises:

determining whether disabling one or more services will increase a duration that the battery can sustain the user activity for the estimated user activity duration based on historic power consumption for each service of the multi-technology wireless communication device; and disabling one or more services in response to determining that disabling the one or more services will increase the duration that the battery can sustain the user activity for the estimated user activity duration.

22. The multi-technology wireless communication device of claim 13, wherein the selected RAT is chosen from the at least one RAT of the list of available RATs based at least in part on the second average power consumption.

23. The multi-technology wireless communication device of claim 13, wherein determining whether moving the user activity to the at least one RAT is based at least in part on the second average power consumption.

24. A multi-technology wireless communication device, comprising:

a battery;

a plurality of radio frequency (RF) resources configured to support a plurality of radio access technologies (RATs);

means for estimating a user activity duration for a user activity executing on the multi-technology wireless communication device based on historic activity usage information;

means for determining a current average power consumption of the user activity based on historic power consumption by the user activity under current operating conditions for a RAT on which the user activity is camped;

means for estimating a service activity duration for the user activity based on at least the current average power consumption and a charge state of the battery;

means for determining whether the estimated user activity duration exceeds the estimated service activity duration; and means for implementing a power management strategy in response to determining that the estimated user activity duration exceeds the estimated service activity duration comprising:

means for generating a list of available RATs;

means for calculating a second average power consumption based on historic power consumption needs of the user activity under the current operating conditions for at least one RAT of the list of available RATs;

means for determining whether moving the user activity to the at least one RAT is possible; and means for moving the user activity to a selected RAT in response to determining that moving the user activity to the at least one RAT is possible.

25. A non-transitory processor readable medium having stored thereon processor-executable instructions configured to cause a processor of a multi-technology wireless communication device to perform operating comprising:
- estimating a user activity duration for a user activity executing on the multi-technology wireless communication device based on historic user activity usage information;
- determining a current average power consumption of the user activity based on historic power consumption by the user activity under current operating conditions for a RAT on which the user activity is camped;
- estimating a service activity duration for the user activity based on at least the current average power consumption and a charge state of a battery;
- determining whether the estimated user activity duration exceeds the estimated service activity duration; and
- implementing a power management strategy in response to determining that the estimated user activity duration exceeds the estimated service activity duration by:
  - generating a list of available RATs;
  - calculating a second average power consumption based on historic power consumption needs of the user activity under the current operating conditions for at least one RAT of the list of available RATs;
  - determining whether moving the user activity to the at least one RAT is possible; and
  - moving the user activity to a selected RAT in response to determining that moving the user activity to the at least one RAT is possible.

* * * * *